INVENTORS
ROBERT H. LINDQUIST
BERNARD F. MULASKEY

United States Patent Office 3,535,245
Patented Oct. 20, 1970

3,535,245
METAL-OXIDE COATED FERRIMAGNETIC PARTICLES
Robert H. Lindquist, Berkeley, and Bernard F. Mulaskey, Pinole, Calif., assignors to Chevron Research Company, San Francisco, Calif., a corporation of Delaware
Continuation of application Ser. No. 745,565, July 17, 1968, which is a continuation-in-part of application Ser. No. 260,964, Feb. 21, 1963. This application Oct. 23, 1969, Ser. No. 871,660
Int. Cl. C04b 35/26; H01f 1/11
U.S. Cl. 252—62.58
9 Claims

ABSTRACT OF THE DISCLOSURE

Microporous ferrimagnetic particles substantially surrounded by a high-resistivity metal-oxide insulator.

RELATED APPLICATIONS

This application is a continuation of application Ser. No. 745,565, now abandoned, which in turn is a continuation-in-part of application Ser. No. 260,964, filed Feb. 21, 1963, now U.S. Pat. 3,425,666.

INTRODUCTION

This application relates to ferrimagnetic materials, including ferrimagnetic ferrospinels (inverse ferrospinels), ferrimagnetic garnets, ferrimagnetic hexagonal iron oxides, and ferrimagnetic perovskites, to compositions containing said materials, and to articles of manufacture containing said materials and compositions.

FERRIMAGNETIC MATERIALS OF THE PRESENT INVENTION

The ferrimagnetic materials of the present invention include the following materials with improved physical and other characteristics, and compositions containing the improved materials.

(A) Ferrimagnetic ferrospinels (inverse ferrospinels)

(1) Pure magnetic ferrites:

$$M^{2+}Fe^{3+}O_4$$

where M is a metal other than cadmium or zinc, and the superscripts indicate the valence state of the metal. Examples: $MgFe_2O_4$, magnesium ferrite; $CoFe_2O_4$, cobalt ferrite; $FeFe_2O_4$, ferrous ferrite.

(2) Mixed magnetic ferrites $$M^{2+}_{A_x}M^{2+}_{B_{1-x}}Fe^{3+}_2O_4$$

where $M_A$ is a first metal and $M_B$ is a different metal.

Examples:

$$Mg^{2+}_xMn^{2+}_{1-x}Fe^{3+}_2O_4$$

$$Co^{2+}_xMn^{2+}_{1-x}Fe^{3+}_2O_4$$

where $X>0$ and $1>X$.

(3) Substitution magnetic ferrites:

$$M^{2+}_AM^{3+}_{B_x}Fe^{3+}_{2-x}O_4$$

Examples:

$$Mg^{2+}Al^{3+}_xFe^{3+}_{2-x}O_4$$

$$Mg^{2+}Cr^{3+}_xFe^{3+}_{2-x}O_4$$

where $X>0$ and $2>X$.

(4) Mixed substitution ferrites:

$$M^{2+}_{A_x}M^{2+}_{B_{1-x}}M^{3+}_{C_Y}M^{3+}_{D_{2-Y}}O_4$$

Example:

$$Ni^{2+}_xCo^{2+}_{1-x}Al^{3+}_YFe^{3+}_{2-Y}O_4$$

where
$X>0$ and $1>X$
$Y>0$ and $2>Y$ (5) Lithium "ferrite": $Li_2O(Fe_2O_3)_5$, or $LiFe_5O_8$.

(B) Ferrimagnetic garnets (1) Pure magnetic (ferrimagnetic) garnets: The general formula for the magnetic garnets is $M_3Fe_2(FeO_4)_3$, where M may be non-magnetic trivalent yttrium, or lutetium, or one of the magnetic rare-earth ions from lanthanum (element 57) through ytterbium (element 70). If the M ions are non-magnetic yttrium or lutetium, the magnetic properties of the material are of a very desirable ferrimagnetic type, particularly in that they have no *compensation point* at which magnetism reverses with increasing temperature. Accordingly, yttrium iron garnet (YIG) and lutetium iron garnet (LIG) are useful in many magnetic applications. If the M ions are magnetic rare-earth ions other than europium and samarium, the garnet materials exhibit a compensation point, and magnetization reverses with increasing temperature; although the materials are ferrimagnetic, they have a temperature instability. It will be seen that, unlike the pure magnetic ferrites, the pure, or unsubstituted, magnetic garnet contains all trivalent ions, and therefore is an extremely *high electrical resistivity* material without the possibility of valence interaction. It will also be seen that of the twenty ions in the formula unit of the pure magnetic garnet only five are magnetic (iron) ions, compared with three magnetic ions out of the seven ions in the formula units of a pure magnetic ferrite.

(2) Substitution garnets: The yttrium iron garnet, for example, can be modified by replacing some of the non-magnetic yttrium by minor amounts of magnetic impurities such as gadolinium or dysprosium; the magnetic properties of the garnet can be widely varied by such substitutions, and the resulting substituted garnets have practical value in microwave and other applications.

(C) Magnetoplumbite structures

The best-known member of the magnetoplumbite class is $$BaFe^{3+}_{12}O_{19}$$

Another group of ferrimagnetic hexagonal materials that are similar are materials that are formed from $BaFe_{12}O_{19}$ or a similar material, and a ferrimagnetic ferrospinel. Examples of these materials are $$BaFe^{2+}_2Fe^{3+}_{16}O_{27}, Ba_2Ni_2Fe_{12}O_{22}, Ba_3Zn_2Fe_{24}O_{41}$$

These compounds have one easy *plane* of magnetization, and high electrical resistivity compared with $$BaFe^{3+}_{12}O_{19}$$

which has one easy *axis* of magnetization, and high electrical resistivity.

(D) Perovskite structures

Ferrimagnetic materials having these structures include $La^{3+}Mn^{3+}O_3 \cdot Me^{2+}Mn^{4+}O_3$, where $Me^{2+}$ is calcium, strontium, lead, cadmium, or barium. Perovskites also have been made by substituting trivalent yttrium, gadolinium or lanthanum for trivalent iron in nickel ferrite. Of the ferrimagnetic materials, perovskites alone have low electrical resistivity and a very low Curie point.

PRIOR ART PROCESSES FOR PRODUCING FERRIMAGNETIC MATERIALS, DEFICIENCIES THEREOF, AND DEFICIENCIES OF FERRIMAGNETIC MATERIALS SO PRODUCED (A) General: Prior art ferrimagnetic material preparation conventionally involves preparation of polycrystalline magnetic materials in two main steps: (a) preparation of a mixture, as uniform as possible, of the non-ferrimagnetic starting materials; and (b) conversion of said starting materials at an elevated temperature to produce the desired ferrimagnetic material by solid state reaction. An example is the solid state reaction of NiO with $Fe_2O_3$ at an elevated temperature to produce the nickel ferrite, $NiFe_2O_3$. In such a solid state reaction the starting materials generally are prepared in powdered form, placed together and heated. The heating causes a mutual diffusion of constituents of each starting material to occur to cause growth at the surface of the two materials of a crystallite of the desired ferrimagnetic ferrospinel. When the resulting material is needed commercially in solid form, or, as is usually the case, the crystals are too big or not sufficiently uniform, the material is powdered again. Thereafter, if a solid shape is desired, the powder is formed into the desired shape and sintered.

(B) Prior art preparation of a mixture of the non-ferrimagnetic starting materials: Generally the *oxide method* is used, wherein the starting materials in oxide form are mixed together in the desired proportions by dry or wet ball milling. This is a process that takes hours to days. After the milling, the material is heated to 500° to 800° C. and the resulting material is rebroken and milled again. This process may be further repeated to obtain additional homogeneity. Another very similar method is the *decomposition method,* wherein the starting materials are mixed, by milling, in salt form instead of oxide form, and then the salts are converted to the oxides by thermal decomposition in air. Another method is the *precipitation method,* which has been used in an attempt to avoid the lengthy milling process of the oxide and decomposition methods. The *objective* is simultaneously to *precipitate* from a solution the required materials, in either hydroxide form or oxalate form, so that the precipitate contains the required metal hydroxides or metal oxalates in the correct proportions, already intimately mixed. For example, the starting materials for magnesium ferrite may be precipitated in hydroxide form as follows:

The aforesaid oxide, decomposition, and precipitation methods involve substantial disadvantages. In the oxide and decomposition methods the lengthy ball milling that is required is a disadvantage that the art has long recognized. Even with extended ball milling, there is room for much improvement in the homogeneity of the resulting mixture. The lack of homogeneity causes further undesirable results: for example, it contributes to lack of uniformity in the ferrimagnetic crystals formed upon subsequent heating of the mixture. The precipitation methods *directionally* improve mixture homogeneity, but entail other disadvantages. For example, when a strong base such as sodium hydroxide is used to cause precipitation, the anion, for example sodium, must be removed from the resulting mixture to purify it, and this can present a difficult purification problem.

(C) Prior art heating of the starting material mixture to produce a ferrimagnetic material by solid state reaction: The solid state reaction of prior art mixtures of non-ferrimagnetic oxides to produce a ferrimagnetic material is an extremely slow reaction, and is accomplished at such temperatures as 1300° to 1450° C. The prior art method has many disadvantages, mainly associated with the competition and form of the starting material mixture. The 1300 to 1450° C. temperature must be maintained for several hours, and slight variations in time, temperature and partial pressure of oxygen cause large and disproportionate effects on the properties of the final material. If the metals are not in their correct valence states in the starting material mixture, and the resulting ferrimagnetic material is formed into a solid shape and sintered, oxidation reactions will occur in the solid shape and cause cracks and imperfections therein. The metal cation constituents of the final ferrimagnetic material must migrate relatively large distances, on the order of a micron or more, through the structure of the oxygen anions, and there is a necessarily incomplete conversion of the starting material mixture to a ferrimagnetic material. The ferrimagnetic crystals are not uniform and because of the high temperatures that are necessary the crystals are large; accordingly, the material must be ball milled again to reduce the crystal size to a desirable size.

(D) Prior art preparation of shapes from oxide mixtures, followed by firing to convert the shaped material to a ferrimagnetic material: The two conventional methods of forming ferrimagnetic material precursor oxides into shapes are die pressing and extruding. In each method a binder and lubricant of organic additives, usually in a water vehicle, is used. A plasticizing agent also is needed in the extruding operation, and this agent must be blended thoroughly through the oxide mixture. The extruding operation is preferred for the production of tubes and rods of any particular cross-sectional shape. The shapes must be heated slowly during the low temperature range of the firing cycle to volatilize the organic additive slowly. Firing to convert the shaped oxide mixture to a ferrimagnetic material generally is accomplished at 1100° to 1350° C. Slow cooling, rather than quenching, minimizes internal strains. The finished ferrimagnetic shapes can be redimensioned by grinding.

(E) Prior art preparation of shapes from ferrimagnetic materials: It is known to first fire the oxide mixtures to convert them to ferrimagnetic materials, and then to regrind these materials and form desired shapes from them by die pressing or extruding and firing in a manner similar to that described above.

(F) Maximizing density of die pressed shapes: To obtain maximum density of die pressed shapes, the die pressing is carried out in a vacuum hot press in which the dies are heated above the plastic deformation temperature of the material, for example 1000° C., with pressure applied to the sample in a vacuum atmosphere. The density of the resulting shapes closely approaches the theoretical density of the material, compared to densities of shapes pressed at ambient conditions. The maximum density is desirable when it is desired to maximize the values of extrinsic magnetic properties, for example $B_S$ and $B_R$.

PRIOR ART DEVICES UTILIZING FERRIMAGNETIC MATERIALS, AND DEFICIENCIES IN MAGNETIC PROPERTIES OF SAID DEVICES (A) General Prior art ferrimagnetic devices have been restricted in magnetic properties by the mode of preparation. Coercive force has been limited to the intrinsic coercive force of the ferrimagnetic material, without the exchange anisotropy enhancement of coercive force that characterize various embodiments of the materials of the present invention.

Crystallite size of ferrimagnetic materials prepared by prior art methods is generally greater than single-domain size; accordingly, prior art switching devices utilizing such materials are limited to switching involving domain wall motion as well as domain rotation. The combination of these two mechanisms decreases the speed and broadens the time for the total device to switch.

A limited range of ferrimagnetic compositions may be prepared by prior art methods since cation migration to the proper anion sites during preparation must be over many atomic distances and, therefore, extremes in temperature are necessary to effect such migration. Chemical valence changes resulting from these high temperatures prevent formation of many important ferrite materials.

The various embodiments of the present invention include improvements on prior art devices, some of which are discussed below.

(B) High coercivity devices ($H_C > 50$ oersteds)

(1) Open flux path devices (a) Radio frequency devices ($\omega < 1000$ mc.)

(1) Magnetic tape: The basic magnetic properties of recording tapes are coercivity, residual induction, and effective permeability. Prior art tapes are divided into three categories. Relatively low coercivity tapes with an $H_C$ of 80–120 oersteds and a residual induction $B_R$ of about 400 gauss are made from spherical particles of $\gamma$-iron oxide. Medium coercivity tapes with an $H_C$ of 200–280 oersteds and a $B_R$ of 500–900 gauss are made from acicular (needle-like) particles of $\gamma$-iron oxide. High coercivity tapes of prior art materials with an $H_C$ of 320–380 oersteds and a $B_R$ of about 600 gauss are usually made from ferrous ferrite or magnetite ($Fe_3O_4$). The effective permeability of the magnetic tapes ranges from 1 to 3. Higher coercivity tapes are preferred since higher frequencies can be impressed on them without having self-erasure (demagnetization) by interparticle magnetic interaction. Also, "print-through" between adjacent layers of tape when wound on the spool is reduced.

Moderate residual induction is desired, sufficient to produce a signal level above the background noise of the tape recorder head amplifier system. For audio, video, and instrument applications, a coercive force of about 800–1200 oersteds, after a 4600 oersted applied field, a residual induction of 400–600 gauss, after an applied field of 4600 oersteds, and a quality factor $B_R/H_C$ of about 0.4 to 0.6 is desirable but generally unobtainable by prior art tapes. For computer tapes, coercive force of about 300–500 oersteds with a high residual induction (preferably above 900 gauss) is desired to store digital information with certainty of accurate retrieval.

(2) Magnetic drums: Magnetic drums are used for the high-speed active memory of computing machines, where from 20 to 1000 recording heads are arranged longitudinally on the periphery of a drum spinning at very high speeds. Signals are retained on a given track on the drum, usually for only one revolution (less than a millisecond), and are transferred and switched to other drum locations or used as impulses in calculations during extremely short times, in the order of microseconds. Design criteria for the magnetic materials include a high coercivity, high residual induction, and no bit transfer to adjacent magnetic areas.

A typical prior art magnetic drum exhibits a coercive force of 450 oersteds and a residual induction of 1200 gauss.

(b) Microwave frequency devices ($\omega > 1000$ mc.)

Because many microwave frequency devices are low-coercivity devices, discussion of the high-coercivity, open flux path devices is included below with the discussion of the low-coercivity devices.

(2) Closed flux path devices (a) Radio frequency devices ($\omega < 1000$ mc.)

Such devices include magnetostrictive filters, which generally consist of a connected series of cylindrical ferrite shapes, which resonate at a radio frequency; the series of shapes will permit passage of a signal having the resonant frequency, while screening out other frequencies. Typical prior art materials have a coercive force of 35 oersteds, $B_S$ of 2175 gauss, and $Q_{eff}$ of 59.

(b) Microwave frequency devices ($\omega > 1000$ mc.)

Traveling wave tubes utilize ferrite permanent magnets with high coercive force to produce a periodically focused field in which the electron beam experiences a sinusoidal variation from one end of the structure. Variation in magnetic properties is affected by ferrite composition and sintering temperature.

(C) Low coercivity devices ($H_C < 50$ oersteds)

(1) Open flux path devices (a) Radio frequency devices ($\omega < 1000$ mc.)

(1) Memory plates: Memory plates consist of thin discs or rectangles up to 10 mils thick, fabricated from low coercive force ferrites. They are used in computer memory circuits where single-turn winds are sufficient to couple with the magnetization of the ferrites. They have an advantage over the closed flux path cores in that printed circuit technology can be used to miniaturize the collection of plates and reduce the total size. Typical prior art material exhibits a coercive force less than 40 oersteds, a saturation magnetization of 2000 gauss, and a switching coefficient less than 1 microsecond oersted.

(2) Radio filter inductors and radio tuner inductors: Ferrite-type inductor cores are used to develop a magnetic coupling between two circuits with a minimum of energy loss in the coupling element. Conventional laminated iron core transformers can operate as high as 200 or 300 cycles per second before hysteresis loss and eddy current losses become prohibitive. Attempts to minimize core loss in high-frequency applications have led first to finely powdered iron cores ("dust cores") that are equivalent to cores having many laminations in many directions, and finally to ferrite cores. The high resistivity of ferrites compared to metals reduces eddy current losses, and the narrow hysteresis loop of low coercive force ferrites minimizes hysteresis losses.

(3) Television flyback transformers: Television flyback transformers used to return the scanning beam after each scan are usually fabricated from high flux density, low core loss ferrite material operable from 15 to 500 kc., typically 15 to 100 kc. Typical core loss at 60 kc. for a material having a saturation magnetization of 1800 gauss at 25° C. is 9 microwatts per cc. c.p.s., with initial permeability of 2000. The low core loss, ease of fabrication and minimum eddy current loss makes ferrite cores more attractive than iron cores.

(b) Microwave frequency devices ($\omega > 1000$ mc.)

(1) General: Microwave ferrimagnetic devices can be divided into low coercivity and high coercivity devices. Low coercivity devices are characterized by a coercive force less than 50 oersteds, which results in a narrow microwave absorption band width making these devices particularly useful for applications requiring low field loss and sharp tuning. High coercivity devices, commonly called broad band devices, find application at microwave frequencies greater than 50 gigacycles ($50 \times 10^9$ cycles) and in applications where wide frequencies of resonance absorption is required. Pertinent properties for ferrimagnetic devices for these applications are their power-handling ability and the frequency range over which they can be operated. The dielectric losses and the magnetic losses must be considered for each application. Particle size determines whether domain wall movement or domain rotation will predominate for the magnetic loss mechanism.

(2) Faraday rotation devices: It is known that a ferrite rod can rotate microwave radiation; in this service is it known as a Faraday rotator, and the rotation is known as Faraday rotation. The rod is surrounded by a solenoid which applies to the rod an axial steady magnetic field of a desired magnitude; the magnitude determines the amount of Faraday rotation. Under such conditions, microwave radiation traveling in one longitudinal direction through the rod will be rotated clockwise in the desired amount, while radiation traveling in the opposite longitudinal direction will be rotated counterclockwise in the same amount.

(2) Closed flux path devices (a) Radio frequency ($\omega < 1000$ mc.)

(1) Computer memory cores. A computer memory core with its associated windings is a form of transformer. The memory core generally has a toroid shape, and can be magnetized in either direction around the toroid. The toroid may be linked with one input wire, which must carry a current pulse, in either direction, sufficient to saturate or fully magnetize the core in either direction. Alternatively, the toroid may be so linked with two input wires (a "coincident-current" arrangement) that it may be fully magnetized by passing one-half saturation current through each wire. In either case, a sensing or output wire also links the coil, to sense a change in the direction of magnetization in the coil.

Generally, an elongated hysteresis loop with a pronounced rectangular shape and substantially vertical sides is desirable for computer cores.

In addition, a low initial permeability, for example below 50, and a high permeability at remanence and a high maximum permeability are desirable. With a high remanence and low coercivity, the desired high permeability at remanence, approaching maximum permeability, will exist.

(2) Microferrite arrays: Microferrite arrays are high-density ferrite devices in which a thin plate (less than 10 mils in thickness) of ferrite is drilled by ultrasonic techniques with multiple holes, each about 0.02 mil in diameter. The ferrite plate possesses sufficient rigidity to permit coating by metal evaporation techniques of conductive paints interconnecting the holes to yield an extremely small array of essentially ferrite cores in the same plate. These microferrite arrays may be stacked in extremely small volume to give a high memory bit density. The principal problem with prior art materials is to prevent eddy current coupling between adjacent holes.

(3) Multiaperture cores: High-speed switching devices are the logic part of high-speed computers. Diodes and other electronic devices or valves are frequently used for the switching operations such as adding, combining into the *and*, *or*, and *not* commands in computer logic. By using multiaperture devices fabricated of ferrite materials, a computer can be fabricated with all magnetic logic and memory parts, permitting more efficient operation, and resulting in smaller size.

(4) Transformers: High-frequency transformer cores fabricated of ferrite material result in less eddy current loss than is obtained with cores made from powdered iron or thin laminations of iron. The ferrite material is fabricated by die pressing in the desired shape and the magnetic properties are varied by ferrite composition and temperature of sintering.

OBJECTS OF THE PRESENT INVENTION (1) To provide ferrimagnetic particles each comprising a ferrimagnetic nucleus surrounded by and coupled by exchange anisotropy to an antiferromagnetic coating, said particles having a coercive force above 500 oersteds after saturation.

(2) To provide ferrimagnetic particles each surrounded by a metal-oxide insulating material.

(3) To provide ferrimagnetic particles, a larger volume percent of which will act as single-domain particles than prior art ferrimagnetic particles, when reduced to the same particle size.

(4) To provide microporous ferrimagnetic particles that will act as single-domain particles when in larger particle size than prior art single-domain particles.

(5) To provide magnetic tapes comprising a coating material comprising a ferrimagnetic material having a higher coercive force with a given drive field than corresponding materials in prior art tapes, for a given tape quality factor, $B_R/H_C$.

(6) To provide magnetic tapes having a more desirable tape quality factor $B_R/H_C$ than prior art tapes, for a given coercive force.

(7) To provide improved ferrimagnetic computer core materials and computer cores.

(8) To provide improved transformer core materials and transformer cores.

(9) To provide improved materials for microwave applications, including novel garnets.

(10) To provide improved materials for other applications in which ferrimagnetic materials are useful.

DRAWINGS

The present invention will be better understood, and additional objects thereof will become apparent, from the following description of the invention, when read in connection with the accompanying drawings, in which.

THE PRESENT INVENTION (A) Statement of invention, general

In accordance with one embodiment of the present invention, the superior microporous and homogeneous ferrimagnetic materials of the present invention may be prepared by a wet process, which can be called the Microgel process, which includes formation of a substantially homogeneous solution of the constituents of the final product, usually followed by subsequent gelation, without a precipitation step, in contrast to the prior art *oxide* and *decomposition* dry processes and the prior art *precipitation* wet process. The resulting immediate *homogeneity* of the product eliminates the need for extensive ball milling and mixing to obtain homogeneity, and only enough ball milling is needed to reduce the ferrimagnetic particles to a desirable size. The *microporosity* of the product provides myriads of natural fracture lines, enabling the product to be much more easily powdered into fine particles than prior art materials. The resulting powdered material contains a smaller ratio of superparamagnetic particles to particles that behave magnetically as single-domain particles than does a corresponding powdered material made by prior art methods. In accordance with this embodiment, the ferrimagnetic materials may be prepared by converting a salt of a first metal, in the divalent state when a ferrite is being prepared, and a salt of a second metal in the trivalent state, at least one of said metals preferably being iron, to a mixture of the corresponding hydroxides in the presence of an epoxy compound, and converting said mixture to the desired microporous ferrimagnetic material by heating.

In accordance with another embodiment of the present invention, there is provided a ferrimagnetic material comprising particles of a ferrimagnetic material, each substantially surrounded by an antiferromagnetic material, said two materials being coupled by exchange anisotropy.

In accordance with a further embodiment of the present invention, there are provided ferrimagnetic particles, each surrounded by a high-resistivity, non-magnetic metal oxide insulator, for example alumina. These particles may be prepared by forming a ferrimagnetic material precursor comprising a uniform metal hydroxide gel which, upon drying and heating to a temperature above 600° C., would be changed in structure to a ferrimagnetic-material structure, passing said gel together with a halide of the metal of the desired insulator, for example aluminum chloride, and a lower alkanol through a colloid mill to form a uniform suspension of fine particles of said gel, adding a lower alkylene oxide to said suspension to form a uniform dispersion of said gel particles in a gel of the desired insulator, for example a hydrous gel of $Al_2O_3$, and heating said uniform dispersion to a temperature above 600° C. to convert the structure of said gel particles to the desired ferrimagnetic material structure, and to convert said insulator gel to a solid form of the desired insulator, for example solid $\alpha\text{-}Al_2O_3$, whereby ferrimagnetic particles individually isolated in the desired insulator are produced.

In accordance with further embodiments of the present invention, there are provided many end-use devices incorporating the ferrimagnetic materials of the present invention and having improved magnetic properties, including computer cores and other memory devices, magnetic tapes, transformers, switching devices, permanent magnets, and microwave devices.

(B) Details of the materials of the present invention, and how they may be prepared

(1) General: The Microgel process, which may be used to prepare the materials of the present invention, comprises converting a salt of a first metal, generally in the divalent state, and a salt of a second metal in the trivalent state, at least one of said metals preferably being iron, to a mixture of the corresponding hydroxides in the presence of an epoxy compound and a source of hydroxyl groups, for example water, said salts comprising halogens having atomic numbers greater than 9, and heating said mixture for a sufficient time to produce a ferrimagnetic material.

The epoxy compound may be any epoxy compound that will react at a reasonable rate with the anion of the metal salt, preferably a lower alkylene oxide or an epichlorohydrin. Said lower alkylene oxide may be, for example, ethylene oxide, propylene oxide or butylene oxide.

The metal salt preferably is a metal halide comprising a halogen having an atomic number greater than 9, i.e., a metal chloride, iodide or bromide. The chlorides and iodides are especially preferred. Salts other than halides, for example nitrates, having anions that will combine with the epoxy compound, may be used.

Desirably a solvent, such as a lower alcohol, should be present.

The following is an example of the reaction that takes place in the Microgel process:

$$+ OCH_2CHCH_3 \rightarrow CoFe_2(OH)_8 + A$$

where $CoFe_2(OH)_8$ is a sol that has the desired homogeneous atomic structure, i.e., it contains a uniform dispersion of each of the various ions, and where A includes all of the remaining reaction products. The $CoFe_2(OH)_8$ sol will slowly form into a gel if permitted to do so, and this is a preferred method of practicing the invention. The remaining reaction products, A, mainly comprise chlorohydrins such as propylene chlorohydrin, and readily vaporize to leave the desired sol or gel in an adequately pure state.

In the above exemplary reaction, assuming that water is the source of the hydroxyl groups, a hydrogen atom from the water molecule attaches to the oxygen atom of the epoxy compound, leaving one of the epoxy compound carbon atoms with an unsatisfied bond. A halogen atom from one of the metal halides attaches to this bond, leaving the metal with an unsatisfied bond. The latter bond is satisfied with the hydroxyl group remaining from the water molecule.

Because it is important to have a homogeneous solution of all of the necessary components of the final product, it is very desirable to have a solvent present that: (a) will keep the metal salts in solution; (b) will keep the epoxy compound in solution; and (c) will not irreversibly react with the precursors of the final product, or with the final product itself, to incorporate undesired constituents into the final product. Such a solvent should be one that is more polar than the epoxy compound, for example an organic solvent such as a lower alcohol or water. If a sufficient amount of water is present, it will act as the necessary solvent in addition to supplying the hydroxyl groups for the desired product. If only water is relied upon as the solvent, it will be very desirable to use ethylene oxide as the epoxy compound rather than a higher alkylene oxide such as propylene oxide, because the solubility of ethylene oxide is higher in water than is the solubility of a higher alkylene oxide, and the higher solubility increases the probability that the desired epoxy compound concentration in the starting solution can be obtained. However, the presence of an organic solvent in addition to the presence of water is most preferred. Such a solvent may be any organic solvent meeting the aforesaid criteria, for example a lower alkanol, for example methanol, ethanol or propanol, or dimethyl formamide. Methyl alcohol is most preferred because it is very polar, as is water.

The metal halides used may be halides of any metals that are desired in the final ferrimagnetic product, so long as a halide of at least one metal, generally in the divalent state, is present, and a halide of at least one other metal, in the trivalent state, is present. For example, halides of $Fe^{+2}$, $Co^{+2}$, $Mg^{+2}$, $Ni^{+2}$, $Mn^{+2}$, $Cu^{+2}$, $Ba^{+2}$, $Fe^{+3}$, $Al^{+3}$, $Cr^{+3}$, $Ti^{+3}$, $Ga^{+3}$, $In^{+3}$, $Gd^{+3}$, $Sc^{+3}$, and $Y^{+3}$ may be used. Preferably a halide of iron will be present, more preferably $Fe^{+3}Cl_3$. The proportions of all of the starting materials can be varied over relatively wide ranges, so long as a homogeneous solution can be obtained. From the present disclosure, including the examples, those skilled in the art will have an adequate guide as to the proportions of ingredients and specific preparation methods that will result in a high degree of homogeneity of the starting mixtures and final ferrimagnetic products. Generally, the constituents of the final ferrimagnetic product may be present in approximately stoichiometric proportions in the starting materials; however, it may be desired to have present an excess of divalent or trivalent iron, particularly when it is desired that the final product have especially high coercivity.

The amounts of each of the starting halides may be varied by substituting for it a halide of a different metal having the same valence, to give various weight percentages of each metal cation in the final ferrimagnetic product.

In the preferred manner of practicing the Microgel process for preparing the materials of the present invention, the sol precursor of the final ferrimagnetic material will form into a gel in a period of a few seconds to a few hours, depending upon the concentration of the various components and the temperature. The resulting gel, after drying to drive off vaporizable materials not forming a part of the gel, is non-ferrimagnetic, but becomes ferrimagnetic after a subsequent heating step.

To convert the non-ferrimagnetic sol or gel to a ferrimagnetic material, it is heated to a temperature above 600° C., preferably above 800° C., more preferably between 1100° C. and 1600° C., to cause the metal cations to migrate between the oxygen anions to the proper sites, e.g., the tetrahedral or octahedral sites of a spinel oxygen structure, as previously discussed. The heating time may be varied from two or three minutes to many hours. However, the higher the temperature the less time will be required for complete cation migration, and after migration is complete continued heating is generally of little use. At 1300° C., a heating time of 3 to 5 hours is desirable. Heating may be terminated prior to complete cation migration, and therefore magnetic properties, particularly coercive force, may be varied by varying the duration of heating.

The resulting ferrimagnetic material is microporous in that it contains myriads of micropores, i.e., pores below 0.1 micron (1000 A.) in diameter, as well as larger pores. Although the larger pores are present, they have a much lower surface area per volume of pore, and so contribute little to the surface area of the material, compared with the contribution to surface area made by the micropores. This extremely high surface area, microporous material accordingly is much more frangible than corresponding prior art materials; because the micropores constitute natural fracture lines, the material can be physically broken down into single-domain particles much more readily than can corresponding prior art materials, which often must be ball milled for days before the particle diameters approach a micron or less.

Not only can the particles readily be broken down in size, but it is not necessary to break them down in size as far as in the case with prior art particles in order to obtain particles having single-domain magnetic behavior. This is because as a particle is broken down in size it is still microporous, and the micropores impede domain wall movement; accordingly, when the particles of the present invention are reduced to a certain size they will behave magnetically as single-domain particles, even though more than one domain is present. Further, particle grinding of a batch of ferrimagnetic powder prepared according to the process of the present invention will result in a smaller ratio of superparamagnetic particles that retain no magnetization after removal of an applied field to particles that behave as single-domain particles than will particle grinding of prior art ferrimagnetic powders, i.e., in both prior art methods and the present method, milling results in the production of superparamagnetic particles, larger single-domain particles that are not paramagnetic, and multi-domain particles. Because some of the latter behave as single-domain particles in the present method, the total amount of particles that behave as single-domain particles that are produced for a given production of superparamagnetic particles is larger in the present process than in prior art processes. For most applications it is desirable to break down the particles of a mass of ferrimagnetic material prepared according to the process of the present invention to an average particle size below about one micron.

The ease with which finely powdered ferrimagnetic materials can be prepared pursuant to the present invention contributes greatly to ease of fabrication of shapes from the powdered materials. The fine powder can be pressed into shapes having dimensions close to the final desired dimensions; accordingly, little finish grinding of the fired shapes is necessary.

(2) Exchange anisotropy coupling between nuclei of ferrimagnetic particles and antiferromagnetic coating surrounding said nuclei: The term "exchange anisotropy" was coined to describe a magnetic interaction between an antiferromagnetic material and a ferromagnetic material. The term has been extended to also cover interaction between antiferromagnetic and ferrimagnetic phases, and also between ferrimagnetic and ferromagnetic phases. In each case, the spin systems of the two phases are coupled.

In one embodiment of the present invention, particles of a ferrimagnetic material are substantially surrounded by a coating of an antiferromagnetic material, and the spin systems of the two phases are coupled by exchange anisotropy to provide a resulting coated ferrimagnetic material in particulate form having a materially higher coercive force than said ferrimagnetic material would have alone, or that said ferrimagnetic and antiferromagnetic material would have together if not coupled by exchange anisotropy. In its preferred form, this embodiment comprises particles of a ferrimagnetic material, especially a ferrimagnetic ferrospinel, substantially surrounded by, and coupled by exchange anisotropy to, $\alpha$-$Fe_2O_3$. Whereas it is most difficult by conventional methods to prepare a ferrimagnetic ferrospinel having a coercive force above 1000 oersteds, after an applied field of 4600 oersteds, this is easily accomplished pursuant to the present invention by coupling to the ferrimagnetic ferrospinel by exchange anisotropy an antiferromagnetic material.

The proportion of the antiferromagnetic material, for example $\alpha$-$Fe_2O_3$, present in the final high-coercive-force material is dependent upon the proportion of the halides of the divalent precursor materials, for example $FeCl_2$ or $CoCl_2$, present in the starting materials, and also upon the temperature at which the mixture of starting materials is heated to convert it to a ferrimagnetic material, and to a limited extent upon the duration of the heating. The proportion of the antiferromagnetic material present in the final product can be varied from about 5 to 95 weight percent. It is increased in this range by increasing the concentration of the divalent starting halide precursor of the antiferromagnetic material, or by increasing the temperature of heating of the gel, or both. Those skilled in the art, by routine experimentation from the teachings herein, will be able to determine how these factors should be varied to vary the results in accordance with their requirements. If more than about 30 volume percent of the antiferromagnetic material is present in the final product, it substantially completely surrounds all of the ferrimagnetic particles.

It is to be noted that in a real sense the use in the magnetic tape field of a ferrimagnetic material coupled by exchange anisotropy to a surrounding antiferromagnetic $\alpha$-$Fe_2O_3$ is not only a departure from the prior art, but in conflict with the prior art, because the magnetic coating on most prior art tapes comprises $\gamma$-$Fe_2O_3$. In the prior art processes, the $\gamma$-$Fe_2O_3$ is derived from $\alpha$-$Fe_2O_3$, which requires all $\alpha$-$Fe_2O_3$ to be converted to $Fe_3O_4$, for example by heating in hydrogen at 400° C., after which the $Fe_3O_4$ is converted to $\gamma$-$Fe_2O_3$, for example by heating in oxygen at 300° C.

It is known that an exchange anisotropy coupling in a material results in a hysteresis loop that is displaced along the H axis when a hysteresis loop is obtained after cooling a specimen of the material in a field to a temperature below a magnetic transition temperature, as discussed in connection with FIG. 7 herein.

Where the ferrimagnetic material comprises iron oxide, it may be coupled by exchange anisotropy to α-iron oxide, as indicated above. Similarly, an antiferromagnetic material other than α-iron oxide, for example α-$Cr_2O_3$, may be coupled by exchange anisotropy to a ferrimagnetic material when the two materials have a similar lattice spacing. The similar lattice spacing provides the necessary close lattice coupling that is necessary for exchange anisotropy.

It is also known that the existence of exchange anisotropy coupling between ferrimagnetic and antiferromagnetic phases results in a hysteresis loop shift, and that the occurrence of this transition is proof of the existence of such coupling. The existence of this type of coupling, for example the coupling of α-$Fe_2O_3$ to a ferrimagnetic material, can be proven by making use of a magnetic transition for α-$Fe_2O_3$, called the "Morin transition," that occurs at $-20°$ C. The antiferromagnetic electron spins of α-$Fe_2O_3$ order in the transverse plane to their direction above $-20°$ C. when cooled through the Morin transition temperature. Thus, by cooling a magnetically saturated system of α-$Fe_2O_3$ and ferrimagnetic material coupled by exchange anisotropy through the Morin transition, a preferred direction of magnetic coupling is "locked in" and a displaced hysteresis loop will result. This transition has been noted experimentally in the materials of this embodiment of the present invention.

In magnetic tape applications the ferrimagnetic particles substantially surrounded by and coupled by exchange anisotropy to an antiferromagnetic material have another outstanding advantage over prior art γ-iron oxide particles for tapes, in that the antiferromagnetic material, for example α-$Fe_2O_3$, is an excellent non-magnetic spacer for keeping the ferrimagnetic particles separated so that they do not cluster and lose their desirable magnetic characteristics. When γ-$Fe_2O_3$ particles are used for magnetic tapes in accordance with prior art procedures, it is necessary to disperse the particles in a non-magnetic spacer material such as a plastic, which often must be present in amounts of around 50 volume percent. Because the particles before they are so dispersed are magnetically agglomerated into clusters, it is necessary to use high-energy input dispersion techniques, for example ball milling of the mixture of particles and plastic for several days, in order to isolate the particles, and the resulting isolation is necessarily incomplete, leaving many chains, rings and clusters of magnetic particles. In accordance with this embodiment of the present invention, each particle is surrounded by a non-magnetic spacer during initial formation of the ferrimagnetic particles, high-energy dispersion techniques are rendered unnecessary, dilution of the particles with plastic non-magnetic spacing material which does not improve coercive force is avoided, and many other tape manufacturing problems are overcome.

(3) Insulation of ferrimagnetic particles with a high-resistivity metal oxide in accordance with the present invention: In the embodiment of the present invention discussed in (A), above, wherein ferrimagnetic material particles each surrounded by α-$Al_2O_3$ insulator are produced, the ferrimagnetic material precursor gel, together with aluminum chloride and a lower alkanol, are passed through a colloid mill to form a uniform suspension of fine particles of said gel. A lower alkylene oxide, for example propylene oxide, is added to said suspension to form a uniform dispersion of said particles in an $Al_2O_3$ gel, in the form of $Al(OH)_3$ which, upon heating, is converted to $Al_2O_3$ as follows:

$$2[Al(OH)_3] \rightarrow 3H_2O + Al_2O_3$$

Upon heating to a temperature above about 600° C., preferably from 800° C. to 1300° C., the structure of said gel particles is converted to a ferrimagnetic material structure, and said $Al_2O_3$ is converted to α-$Al_2O_3$, the resulting material being a microporous mass easily broken down into ferrimagnetic particles, each having single-domain-particle magnetic behavior and each being individually isolated in an α-$Al_2O_3$ coating. Any other desired non-magnetic, high-resistivity metal oxide, for example silica, zirconia or magnesia, may be used as a coating instead of alumina, by employing a halide of the desired metal instead of a halide of aluminum. The preferred halides for the aforesaid reaction are the chlorides, iodides and bromides, i.e., those halides comprising halogens having atomic numbers greater than 9, therefore excluding fluorides. The chlorides and iodides are especially preferred. For a silica or silica-containing coating, tetraethyl orthosilicate or a homolog thereof is preferred.

In accordance with this embodiment of the present invention, ferrimagnetic particles may be produced each of which is surrounded by, and coupled by exchange anisotropy to, an antiferromagnetic material, with the resulting composite being further encased in a shell of the desired insulating material.

As in the case where particles are provided in accordance with the present invention with an antiferromagnetic coating coupled by exchange anisotropy to a ferrimagnetic core, the metal oxide coating embodiment of the present invention eliminates the need for prior art expedients for dispersing ferrimagnetic particles in plastic in an attempt to eliminate clusters and chains and rings of the particles, for magnetic tape applications.

Further, the metal oxide-coated particles of this embodiment can be formed into shaped materials for high-speed switching and microwave devices that have unique and desirable magnetic characteristics, particularly in that all changes in magnetization are primarily by domain rotation, and undesirable eddy current losses at high frequencies are minimal.

(4) Examples of the materials of the present invention and preparation thereof:

(a) GENERAL

In all of the following groups of examples, the Microgel process was used to prepare ferrimagnetic materials. The gel produced in each example was dried in a drying oven to dryness at 300° F. The resulting dried product was then treated in three steps: (a) heating at 800° C. in an air atmosphere for 4 hours to convert the dried gel to a form which could be readily powdered; in this step the hydroxides were converted to mixed oxides and the material was ground to a powder; although this step was not necessary, it facilitated the production of a denser powder so that more material could be treated in a particular furnace in the subsequent heating step; (b) powdering of the resulting material in a conventional manner; (c) firing at the indicated temperature, for example 1200° C. or 1300° C., for 4 hours in order to convert the powder to a ferrimagnetic material. In each case, the type of ferrimagnetic material produced was vertified by X-ray diffraction data.

Magnetic and other properties of the materials produced in the following groups of examples are given following each group of examples.

(b) FERRITE EXAMPLES

Example 1

A solution of the following composition was prepared:

| | | |
|---|---|---|
| $CoCl_2$ | g | 94.4 |
| $FeCl_2$ | g | 133.6 |
| $FeCl_2$ | g | 428.2 |
| $CH_3OH$ | cc | 1000 |
| $H_2O$ | cc | 250 |

The solution was cooled to 0° C. 200 cc. of propylene oxide were added, the temperature rose and was returned to 0° C., and 200 cc. more of propylene oxide were added.

Figure 1:
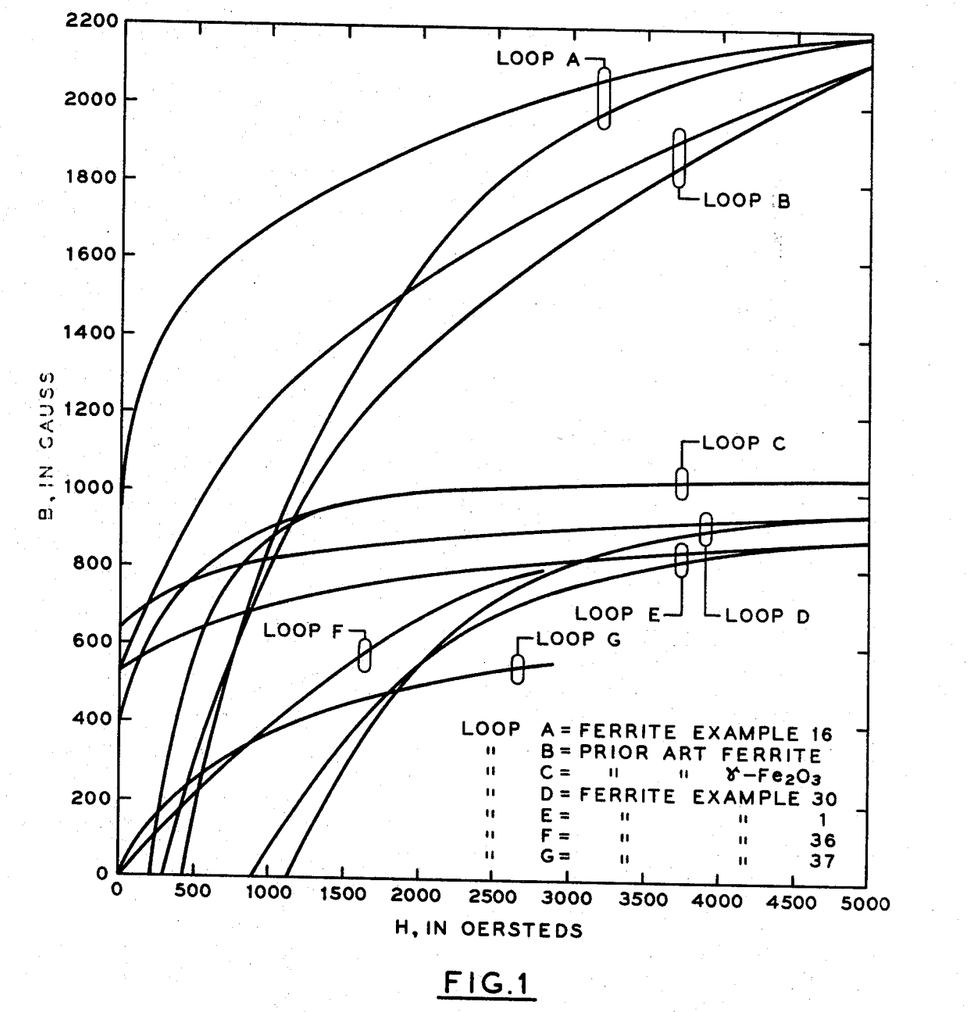
FIG. 1 is a graph showing comparisons of portions of hysteresis loops of particular ferrimagnetic materials according to the present invention with hysteresis loops of various prior art magnetic materials.

The resulting material set up into a gel in 12 minutes. A powdered portion of this gel was fired at 1300° C. to convert the powder to a ferrimagnetic material. The hysteresis loop for this material is discussed in connection with netic material.

Example 2

A powdered portion of the gel produced in Example 1 was fired at 1200° C. to convert the powder to a ferrimagnetic material.

Example 3

A solution of the following composition was prepared:

| | | |
|---|---|---|
| $CoCl_2$ | g | 61.8 |
| $FeCl_2$ | g | 120.1 |
| $FeCl_3$ | g | 466.0 |
| $CH_3OH$ | cc | 1000 |
| $H_2O$ | cc | 250 |

The solution was cooled to 0° C., 200 cc. of propylene oxide were added, the temperature rose and returned to 0° C., and 200 cc. more of propylene oxide were added. The resulting material set up into a gel in 12 minutes. A powdered portion of this gel was fired at 1300° C. to convert the powder to a ferrimagnetic material.

Example 4

A powdered portion of the gel produced in Example 3 was fired at 1200° C. to convert the powder to a ferrimagnetic material.

Example 5

A solution of the following composition was prepared:

| | | |
|---|---|---|
| $CoCl_2$ | g | 710 |
| $FeCl_2$ | g | 1466 |
| $FeCl_3$ | g | 4694 |
| $CH_3OH$ | litres | 6.6 |
| $H_2O$ | do | 2.5 |
| Propylene oxide | do | 2.0 |

The solution was allowed to cool to room temperature, then 2 liters more of propylene oxide were added. The resulting material set up into a gel in 2 minutes. A powered portion of this gel was then fired at 1300° C., and the resulting material was finely ground in two successive passes through a fluid energy pulverizing machine.

Example 6

A powdered portion of the material in Example 5 that had been heated at 800° C. was then fired at 1300° C., and the resulting material was finely ground in one pass through a fluid energy pulverizing machine.

Example 7

A portion of the material in Example 5 that had been heated at 800° C. was then fired at 1200° C., and the resulting material was then finely ground in one pass through a fluid energy pulverizing machine.

Example 8

A solution of the following composition was prepared:

| | | |
|---|---|---|
| $CoCl_2$ | g | 237.95 |
| $FeCl_3$ | g | 224.4 |
| $CH_3OH$ | cc | 2000 |
| $H_2O$ | cc | 500 |

The solution was cooled to 0° C., and 670 cc. propylene oxide were added. The resulting material set up into a gel in 5 minutes. A powdered portion of this gel was fired at 1300° C. to convert the powder into a ferrimagnetic material.

Example 9

A powdered portion of the gel produced in Example 8 was fired at 1200° C. to convert the powder to a ferrimagnetic material.

Example 10

A powdered portion of the gel produced in Example 8 was fired at 1100° C. to convert the powder to a ferrimagnetic material.

Example 11

A solution of the following composition was prepared:

| | | |
|---|---|---|
| $CoCl_2$ | g | 237.95 |
| $FeCl_3$ | g | 324.4 |
| $CH_3OH$ | cc | 2000 |
| $H_2O$ | cc | 500 |

The solution was cooled to 0° C. and 670 cc. propylene oxide were added. The resulting material set up into a gel in 5 minutes. A powdered portion of this gel was fired at 1300° C. to convert the powder to a ferrimagnetic material.

Example 12

A powdered portion of the gel produced in Example 11 was fired at 1200° C. to convert the powder to a ferrimagnetic material.

Example 13

A powdered portion of the gel produced in Example 11 was fired at 1100° C. to convert the powder to a ferrimagnetic material.

Example 14

A solution of the following composition was prepared:

| | | |
|---|---|---|
| $CoCl_2$ | g | 178.4 |
| $FeCl_2$ | g | 49.7 |
| $FeCl_3$ | g | 324.4 |
| $CH_3OH$ | cc | 2000 |
| $H_2O$ | cc | 500 |

The solution was cooled to 0° C. and 400 cc. propylene oxide were added. The resulting material set up into a gel in a few minutes. A powdered portion of the gel was fired at 1300° C. to convert the powder to a ferrimagnetic material.

Example 15

A powdered portion of the gel produced in Example 14 was fired at 1200° C. to convert the powder to a ferrimagnetic material.

Example 16

A powdered portion of the gel produced in Example 14 was fired at 1100° C. to convert the powder to a ferrimagnetic material. The hysteresis loop for this material is discussed in connection with FIG. 1 herein.

Example 17

A solution of the following composition was prepared:

| | | |
|---|---|---|
| $FeCl_2$ | g | 324.4 |
| $CH_3OH$ | cc | 1500 |
| $H_2O$ | cc | 250 |

The solution was cooled to 0° C. and 270 cc. propylene oxide were added. The resulting material set up into a gel in 5 minutes. A powdered portion of this gel was fired at 1300° C. to convert the powder to α-iron oxide.

Example 18

A solution of the following composition was prepared:

| | | |
|---|---|---|
| $AlCl_3$ | g | 482.9 |
| $CH_3OH$ | cc | 1500 |
| $H_2O$ | cc | 250 |

Example 19

To one-third the gel in Example 17 was added one-half of the solution in Example 18. The resulting mixture was mixed in a colloid mill for 15 minutes, then 270 cc. propylene oxide were added. The resulting material set up into a gel in 5 minutes. A powdered portion of this material was heated at 1300° C. to convert the powder to a ferrimagnetic material.

Example 20

To one-third of the gel in Example 17 was added one-half of the solution in Example 18. The resulting mixture was mixed in a colloid mill for one hour, then 220 cc. propylene oxide were added. The resulting material set up into a gel in 5 minutes. A powdered portion of this material was heated at 1300° C. to convert the powder to a ferrimagnetic material.

Example 21

A solution of the following composition was prepared:

| | | |
|---|---|---|
| $CoCl_2$ | g | 94.5 |
| $FeCl_2$ | g | 133.6 |
| $FeCl_3$ | g | 428.2 |
| $CH_3OH$ | cc | 1000 |
| $H_2O$ | cc | 250 |

The solution was cooled to 0° C., 200 cc. propylene oxide were added, the temperature was allowed to return to 0° C., and 200 cc. more of propylene oxide were added. The resulting material set up into a gel in 12 minutes. A powdered portion of this material was fired at 1300° C. to convert the powder to a ferrimagnetic material.

Example 22

A further powdered portion of the material in Example 21 was fired at 1100° C. to convert the powder to a ferrimagnetic material.

Example 23

A solution was prepared in the same proportions as, and in 1⅓ times the volume of, the solution of Example 18.

Example 24

One-half the solution of Example 23 was added to one-third of the gel material in Example 21. The mixture was mixed in a colloid mill for 15 minutes, then 270 cc. propylene oxide were added. The resulting material set up into a gel in one hour. A powdered portion of this material was fired at 1300° C. to convert the powder to a ferrimagnetic material.

Example 25

A further powdered portion of the material in Example 24 was fired at 1100° C. to convert the powder to a ferrimagnetic material.

Example 26

One-half the solution of Example 23 was added to one-third of the gel material in Example 21. The mixture was mixed in a colloid mill for one-half hour, then 220 cc. propylene oxide were added. The resulting material set up into a gel in one hour. A powdered portion of this material was fired at 1200° C. to convert the powder to a ferrimagnetic material.

Example 27

A further powdered portion of the gel material in Example 26 was fired at 1100° C. to convert the powder to a ferrimagnetic material.

Example 28

A solution of the following composition was prepared:

| | | |
|---|---|---|
| $CoCl_2$ | g | 1071 |
| $FeCl_2$ | g | 1515 |
| $FeCl_3$ | g | 2903 |
| $CH_3OH$ | litres | 22 |
| $H_2O$ | do | 4 |

The solution was cooled to 13° C., 2250 cc. propylene oxide were added, the temperature rose to 34° C., 2250 cc. more of propylene oxide were added, and the resulting material set up into a gel in 3 minutes. After drying at 300° C., this material had a pore volume of 0.144 cc. per gram, and a surface area of 16 m.²/g. A powdered portion of this gel was heated at 800° C. for 4 hours to convert the powder to a ferrimagnetic material, and then ground to 100 mesh. The resulting material had a pore volume of 0.06 cc. per gram, and a surface area of 3 m.²/g. A further powdered portion of the aforesaid gel was fired for 4 hours at 1300° C. to convert the powder to a ferrimagnetic material having the magnetic properties listed in the table below, and having a pore volume of 0.0313 cc./gram and a surface area of 3 m.²/g. after being ground to 100 mesh. The aforesaid pore volumes and surface areas are typical of the ferrimagnetic materials of the present invention; the powdered materials have an average particle size below 1 micron, together with pore volumes above 0.02 cc. per gram, and surface areas above 2 m.²/gram, in comparison with prior art materials which do not have such large pore volumes and high surface areas.

Example 29

A powdered portion of the gel material in Example 28 was fired at 1300° C. to convert the powder to a ferrimagnetic material.

Example 30

A further powdered portion of the gel material in Example 28 was fired at 1300° C. to convert the powder to a ferrimagnetic material. The hysteresis loop for this material is discussed in connection with FIG. 1 herein.

Example 31

A further powdered portion of the ferrimagnetic material in Example 28 was more finely powdered by passage through a fluid energy pulverizing machine.

Example 32

Example 31 was repeated with a further powdered portion of the ferrimagnetic material in Example 28. A specimen made from the resulting ferrimagnetic material was cooled in liquid nitrogen and a Morin transition obtained, evidencing the presence of exchange anisotropy coupling between the ferrimagnetic component and the antiferromagnetic component of each particle, as discussed in connection with FIG. 7 herein.

Example 33

Example 31 was repeated with a further powdered portion of the ferrimagnetic material in Example 28.

Example 34

Example 31 was repeated with a further powdered portion of the ferrimagnetic material in Example 28.

Example 35

For purposes of comparison with the material produced in Example 32, a cobalt ferrite was prepared by conventional prior art methods. 15.05 g. $\gamma$-$Fe_2O_3$ and 4.6 g. CoO were ball milled in a conventional ball mill for 84 hours, after which the mixture was fired for 4 hours at 1300° C. X-ray diffraction examination showed that the resulting material was all cobalt ferrite, and therefore contained no $\alpha$-iron oxide. The material was cooled in liquid nitrogen and an attempt was made to obtain a displaced hysteresis loop evidencing the presence of exchange anisotropy coupling, with negative results.

Example 36

A solution of the following composition was prepared:

| | | |
|---|---|---|
| $FeCl_3$ | g | 34 |
| $MgCl_2$ | g | 12.5 |
| $MnCl_2$ | g | 37 |
| $CH_3OH$ (water of hydration of chlorides) | cc | 750 |
| Propylene oxide | ml | 500 |

The resulting material set up into a gel, $$Mg_{0.5}Mn_{1.5}Fe_{1.0}(OH)_8$$

in 30 minutes. A portion of this material, after being heated 4 hours at 800° C., was compressed into a disc shape, then reduced in hydrogen in a magnetic field of 10,000 oersteds at 450° C. for 4 hours.

Example 37

A solution of the following composition was prepared:

| | | |
|---|---|---|
| $FeCl_3$ | g | 34 |
| $MgCl_2$ | g | 12.5 |
| $MnCl_2$ | g | 37 |
| $AlCl_3$ | g | 30 |
| $CH_3OH$ (water of hydration of chlorides) | cc | 750 |
| Propylene oxide | ml | 500 |

The resulting material set up into a gel, $$Mg_{0.5}Mn_{1.5}Fe_{1.0}Al_{1.0}(OH)_{11}$$

in 10 minutes. A portion of this material, after being heated 4 hours at 800° C. to produce a substitution ferrite having a stoichiometric excess of aluminum, was compressed into a disc shape, then reduced in hydrogen in a magnetic field of 10,000 oersteds at 450° C. for 4 hours.

Example 38

A portion of the gel material of Example 36, after being heated for 4 hours at 800° C., is hot pressed into a toroidal shape of a size suitable for a computer memory core.

The solution was cooled to 0° C., and 34 cc. propylene oxide were added. The resulting material set up into a gel in 5 minutes. A powdered portion of this material was fired at 1300° C. to convert the powder to a ferrimagnetic material.

Example 2

A solution of the following composition was prepared:

| | | |
|---|---|---|
| $GdCl_3$ | g | 13.5 |
| $FeCl_3$ | g | 13.8 |
| $FeCl_2$ | g | 6.7 |
| $CH_3OH$ | ml | 50 |

The solution was cooled to 0° C., and 34 cc. propylene oxide were added. The resulting material set up into a gel in 5 minutes. A powdered portion of this material was fired at 1200° C. to convert the powder to a ferrimagnetic material.

Example 3

A solution of the following composition was prepared:

| | | |
|---|---|---|
| $YCl_3$ | g | 245.9 |
| $FeCl_3$ | g | 219.2 |
| $FeCl_2$ | g | 107.2 |
| $CH_3OH$ | cc | 1480 |
| $H_2O$ | cc | 400 |

The solution was cooled to 0° C. and 178 cc. propylene oride were added. The resulting material set up into a gel in 15 minutes.

TABLE OF MAGNETIC PROPERTIES OF MATERIALS PRODUCED IN FOREGOING FERRITE EXAMPLES

| Example No. | Molecular proportions of starting materials | | | | | $B_R$ | $B_{AF}$ | $H_C$ | $B_R/B_{AF}$ | $\mu^\circ$ | Firing temp., °C. | Applied field (AF), oersteds |
|---|---|---|---|---|---|---|---|---|---|---|---|---|
| | $Co^{+2}$ | $Fe^{+2}$ | $Fe^{+3}$ | O | $Al_2O_3$, vol. percent | | | | | | | |
| 1 | 0.5 | 0.95 | 2.0 | 4.0 | | 479 | 870 | 855 | 0.545 | 1.2 | 1,300 | 4,600 |
| 2 | 0.5 | 0.95 | 2.0 | 4.0 | | 310 | 1,107 | 296 | 0.280 | 1.8 | 1,200 | 4,600 |
| 3 | 0.3 | 0.7 | 2.0 | 4.0 | | 273 | 557 | 756 | 0.490 | 1.1 | 1,300 | 4,600 |
| 4 | 0.3 | 0.7 | 2.0 | 4.0 | | 185 | 740 | 279 | 0.250 | 1.1 | 1,200 | 4,600 |
| 5 | 0.15 | 0.85 | 2.0 | 4.0 | | 329 | 623 | 920 | 0.521 | 0.83 | 1,300 | 4,600 |
| 6 | 0.15 | 0.85 | 2.0 | 4.0 | | 382 | 672 | 854 | 0.569 | 0.74 | 1,300 | 4,600 |
| 7 | 0.15 | 0.85 | 2.0 | 4.0 | | 208 | 651 | 296 | 0.320 | 1.5 | 1,200 | 4,600 |
| 8 | 1.0 | 0.0 | 2.0 | 4.0 | | 703 | 2,424 | 122 | 0.290 | 2.1 | 1,300 | 4,600 |
| 9 | 1.0 | 0.0 | 2.0 | 4.0 | | 372 | 1,698 | 43 | 0.219 | 5.7 | 1,200 | 4,600 |
| 10 | 1.0 | 0.0 | 2.0 | 4.0 | | 669 | 2,505 | 122 | 0.267 | 2.0 | 1,100 | 4,600 |
| 11 | 1.0 | 0.0 | 2.0 | 4.0 | | 680 | 2,765 | 99 | 0.246 | 2.4 | 1,300 | 4,600 |
| 12 | 1.0 | 0.0 | 2.0 | 4.0 | | 480 | 2,124 | 99 | 0.226 | 2.7 | 1,200 | 4,600 |
| 13 | 1.0 | 0.0 | 2.0 | 4.0 | | 808 | 2,384 | 148 | 0.339 | 1.96 | 1,100 | 4,600 |
| 14 | 0.75 | 0.25 | 2.0 | 4.0 | | 841 | 2,604 | 230 | 0.323 | 1.4 | 1,300 | 4,600 |
| 15 | 0.75 | 0.25 | 2.0 | 4.0 | | 802 | 2,481 | 263 | 0.323 | 1.2 | 1,200 | 4,600 |
| 16 | 0.75 | 0.25 | 2.0 | 4.0 | | 961 | 2,445 | 427 | 0.393 | 1.3 | 1,100 | 4,600 |
| 17 | 0.0 | 1.0 | 0.0 | 3.0 | | 11 | 19 | 552 | 0.566 | 0.25 | 1,300 | 4,600 |
| 18 | 0.0 | 0.0 | 0.0 | | | | | | | | | |
| 19 | 0.0 | 3.0 | 2.0 | 4.0 | 50.0 | 3 | 9 | 100 | 0.360 | 0.21 | 1,300 | 4,600 |
| 20 | 0.0 | 3.0 | 2.0 | 4.0 | 50.0 | 4 | 16 | 99 | 0.260 | 0.47 | 1,300 | 4,600 |
| 21 | 0.5 | 0.95 | 2.0 | 4.0 | | 578 | 979 | 772 | 0.590 | 1.3 | 1,300 | 4,600 |
| 22 | 0.5 | 0.95 | 2.0 | 4.0 | | 290 | 764 | 427 | 0.379 | 0.67 | 1,100 | 4,600 |
| 23 | 0.0 | 0.0 | 0.0 | | | | | | | | | |
| 24 | 0.5 | 0.95 | 2.0 | 4.0 | 50.0 | 269 | 386 | 158 | 0.698 | 3.4 | 1,300 | 4,600 |
| 25 | 0.5 | 0.95 | 2.0 | 4.0 | 50.0 | 89 | 187 | 362 | 0.476 | 1.7 | 1,100 | 4,600 |
| 26 | 0.5 | 0.95 | 2.0 | 4.0 | 50.0 | 126 | 242 | 240 | 0.519 | 2.0 | 1,200 | 4,600 |
| 27 | 0.5 | 0.95 | 2.0 | 4.0 | 50.0 | 85 | 178 | 329 | 0.475 | 1.3 | 1,100 | 4,600 |
| 28 | 0.5 | 0.95 | 2.0 | 4.0 | | 653 | 932 | 756 | 0.700 | 1.8 | 1,300 | 4,600 |
| 29 | 0.5 | 0.95 | 2.0 | 4.0 | | 667 | 966 | 1,038 | 0.690 | 1.8 | 1,300 | 4,600 |
| 30 | 0.5 | 0.95 | 2.0 | 4.0 | | 651 | 879 | 1,084 | 0.740 | 1.6 | 1,300 | 4,600 |
| 31 | 0.5 | 0.95 | 2.0 | 4.0 | | 875 | 1,326 | 1,512 | 0.66 | 0.59 | 1,300 | 4,600 |
| 32 | 0.5 | 0.95 | 2.0 | 4.0 | | 1,346 | 1,794 | 5,717 | 0.75 | 1.08 | 1,300 | 15,000 |
| 33 | 0.5 | 0.95 | 2.0 | 4.0 | | 1,403 | 2,093 | 2,696 | 0.67 | 1.7 | 1,300 | 15,000 |
| 34 | 0.5 | 0.95 | 2.0 | 4.0 | | 1,446 | 1,944 | 5,771 | 0.74 | | 1,300 | 15,000 |
| 35 | 0.5 | 0.95 | 2.0 | 4.0 | | 449 | 748 | 2,157 | 0.60 | 0.98 | 1,300 | 15,000 |
| | $Mg^{+2}$ | $Mn^{+2}$ | $Fe^{+3}$ | O | $Al^{+3}$ | | | | | | | |
| 36 | 0.5 | 1.5 | 1.0 | 4.0 | | 15.5 | 946 | <15 | 0.166 | 2.0 | 800 | 3,000 |
| 37 | 0.5 | 1.5 | 1.0 | 4.0 | 1.0 | 10.0 | 492 | 10- | 0.2 | 10+ | 800 | 3,000 |
| 38 | 0.5 | 1.5 | 1.0 | 4.0 | | 850 | 946 | <15 | 0.9 | 2.0 | 800 | 100 |

(c) GARNET EXAMPLES

Example 1

A solution of the following composition was prepared:

| | | |
|---|---|---|
| $YCl_3$ | g | 4.0 |
| $GdCl_3$ | g | 8.1 |
| $FeCl_3$ | g | 13.8 |
| $FeCl_2$ | g | 6.7 |
| $CH_3OH$ | ml | 50 |

Example 4

A solution of the following composition was prepared:

| | | |
|---|---|---|
| $AlCl_3$ | g | 189.4 |
| $CH_3OH$ | cc | 267 |
| $H_2O$ | cc | 200 |

Example 5

One-half the gel material in Example 3 was added to one-half the solution in Example 4, the mixture was mixed in a colloid mill for 5 minutes, 157.7 cc. propylene oxide were added. The resulting material set up into a onds. The resulting material was removed from the mill and set up into a gel in 5 minutes. A powdered portion of this material was fired at 1300° C. to convert the powder to a ferrimagnetic material.

Example 6

One-half the gel material in Example 3 was added to one-half the solution in Example 4, the mixture was mixed in a colloid mill for 30 minutes, 157.7 cc. propylene oxide were added, and milling was continued for 30 seconds. The resulting material was removed from the mill and set up into a gel in 5 minutes. A powdered portion of this material was fired at 1300° C. to convert the powder to a ferrimagnetic material.

Example 3

A solution of the following composition was prepared:

$BaCl_2$ ------------------------------------- g-- 15.7
$NiCl_2$ ------------------------------------- g-- 18.2
$CoCl_2$ ------------------------------------- g-- 12.1
$FeCl_3$ ------------------------------------- g-- 272.2
$CH_3OH$ ------------------------------------- cc-- 450
$H_2O$ --------------------------------------- cc-- 221

The solution was cooled to 0° C., 28.5 cc. of propylene oxide were added, the temperature rose and was returned to 0° C., and 199.6 cc. more of propylene oxide were added. The temperature was allowed to rise to 55° C., and the resulting material set up into a gel in 2 minutes.

TABLE OF MAGNETIC PROPERTIES OF MATERIALS PRODUCED IN FOREGOING GARNET EXAMPLES

| Garnet example No. | Molecular proportions of starting materials | | | | | Wt. of sample, grams | Vol. percent, $Al_2O_3$ | $B_R$ | $B_{4600}$ | $B_R/B_{4600}$ | $H_C$ | $\mu°$ | Firing temp., °C. | Applied field, oersteds |
|---|---|---|---|---|---|---|---|---|---|---|---|---|---|---|
| | $Y^{+3}$ | $Gd^{+3}$ | $Fe^{+2}$ | $Fe^{+3}$ | O | | | | | | | | | |
| 1 | 1.2 | 1.8 | 2.0 | 3.0 | 12.0 | .124 | | 74 | 240 | .31 | 11.8 | 16.5 | 1,300 | 4,600 |
| 2 | 0.0 | 3.0 | 2.0 | 3.0 | 12.0 | .09 | | 5.7 | 11 | .52 | 33.0 | .45 | 1,200 | 4,600 |
| 3 | 3.0 | 0.0 | 2.0 | 3.0 | 12.0 | | | | | | | | | |
| 4 | | | | | | | | | | | | | | |
| 5 | 3.0 | | 2.0 | 3.0 | 12.0 | .167 | 30 | 16.1 | 45 | .35 | 47 | .78 | 1,300 | 4,600 |
| 6 | 3.0 | | 2.0 | 3.0 | 12.0 | | 30 | | | | | | 1,300 | 4,600 |

(d) HEXAGONAL IRON OXIDE EXAMPLES

Example 1

A solution of the following composition was prepared:

$BaCl_2$ ------------------------------------- g-- 15.7
$NiCl_2$ ------------------------------------- g-- 18.2
$CoCl_2$ ------------------------------------- g-- 12.1
$FeCl_3$ ------------------------------------- g-- 272.2
$CH_3OH$ ------------------------------------- cc-- 450
$H_2O$ --------------------------------------- cc-- 221

The solution was cooled to 0° C., 28.5 cc. of propylene oxide were added, the temperature rose and was returned to 0° C., and 199.6 cc. more of propylene oxide were added. The temperature was allowed to rise to 55° C., and the resulting material set up into a gel in 2 minutes.

Example 4

A solution of the following composition was prepared:

$AlCl_3$ ------------------------------------- g-- 473.6
$CH_3OH$ ------------------------------------- cc-- 670
$H_2O$ --------------------------------------- cc-- 400

Example 5

One quarter of the gel of Example 3 was mixed with one-quarter of the solution of Example 4 in a colloid mill for 5 minutes. 180 cc. propylene oxide were added to the mixture in the mill, and milling was continued for 30 seconds. The resulting material was removed from the mill and set up into a gel in 2 minutes. A powdered portion of this material was fired at 1200° C. to convert the powder to a ferrimagnetic material.

TABLE OF MAGNETIC PROPERTIES OF MATERIALS PRODUCED IN FOREGOING HEXAGONAL IRON OXIDE EXAMPLES

| Example No. | Molecular proportions of starting materials | | | | | Vol. percent, $Al_2O_3$ | $B_R$ | $B_{4600}$ | $B_R/B_{4600}$ | $H_C$ | $\mu°$ | Firing temp., °C. | Applied field, oersted |
|---|---|---|---|---|---|---|---|---|---|---|---|---|---|
| | $Co^{+2}$ | $Ba^{+2}$ | $Ni^{+2}$ | $Fe^{+3}$ | O | | | | | | | | |
| 1 | 0.8 | 1.0 | 1.2 | 15.6 | 26.4 | | | | | | | 1,200 | 4,600 |
| 2 | 0.2 | 1.0 | 1.8 | 15.6 | 26.4 | | 1,350 | 5,400 | .25 | 20 | | 1,200 | 4,600 |
| 3 | 0.8 | 1.0 | 1.2 | 15.6 | 26.4 | | | | | | | | |
| 4 | | | | | | | | | | | | | |
| 5 | 0.8 | 1.0 | 1.2 | 15.6 | 26.4 | 15.0 | | | | | | 1,200 | 4,600 |

A powdered portion of this gel was fired at 1200° C. to convert the powder to a ferrimagnetic material.

Example 2

A solution of the following composition was prepared:

$BaCl_2$ ------------------------------------- g-- 16.4
$NiCl_2$ ------------------------------------- g-- 14.2
$CoCl_2$ ------------------------------------- g-- 1.6
$FeCl_3$ ------------------------------------- g-- 272
$CH_3OH$ ------------------------------------- cc-- 469
$H_2O$ --------------------------------------- cc-- 226

The solution was cooled to 0° C., 27.3 cc. of propylene oxide were added, the temperature rose and was returned to 0° C., and 191.7 cc. of propylene oxide were added. The temperature was allowed to rise to 35° C., and the resulting material set up into a gel in 5 minutes. A powdered portion of this material was fired at 1200° C. to convert the powder to a ferrimagnetic material.

(C) Details of ferrimagnetic device embodiments of the present invention (1) General: Ferrimagnetic device embodiments of the present invention are superior to corresponding prior art devices in many respects, including the following:

(a) Superior microcrystalline grain size as a result of control of temperature and composition during the initial solution preparation and subsequent calcining steps; a powdered final product can be produced having particles of uniform size in the submicron region, e.g. 0.01 to 1 micron diameter.

(b) Single magnetic domain ferrimagnetic particles insulated with a high dielectric magnetic metal oxide, obtained by a uniform dispersion of ferrimagnetic particles of controlled size in a high-resistivity dielectric during preparation.

(c) Microporous product, obtained by control of processing temperature and other variable during preparation.

(d) Exchange anisotropy-coupled ferrimagnetic materials, permitting selection of materials of widely varying ratios of $H_C$ to $B_R$ and $B_R$ to $B_S$.

(e) Mixed and substitution ferrites in uniform dielectric matrices, combining the magnetic properties of various individual pure ferrites, and having the aforesaid advantages.

(2) Examples of various specific ferrimagnetic device embodiments of the present invention:

(a) HIGH COERCIVITY DEVICES ($H_C > 50$ OERSTEDS)

Example 1

A magnetic tape is fabricated using the material of ferrite Example 30 herein. The material, after being calcined for 4 hours at 1300° C. and then powdered in a fluid energy pulverizing machine, is dispersed in an acrylic plastic and the dispersion is used to coat a Mylar film backing. While the coating is being dried, the tape is subjected to a magnetic field to align the magnetic particles in a desired direction. The quality factor (ratio of residual induction to coercive force) is 0.6, a very desirable value for high-frequency video and audio tape, and the coercive force at an applied field of 4600 oersteds is around 1000, also a very desirable value. These magnetic properties permit the tape to satisfactorily record a given frequency signal at a far slower tape speed than most conventional tapes. This is an example of tapes that can be produced pursuant to the present invention with a coercive force from 800 to 1200 oersteds after an applied field of 4600 oersteds, a residual induction of 400 to 600 gauss after an applied field of 4600 oersteds, and a quality factor $B_R/H_C$ of 0.4 to 0.6.

Example 2

A magnetic tape is fabricated as in Example 1, using the material of ferrite Example 16 herein, powdered in a fluid energy pulverizing machine. The high residual induction (960 gauss), in combination with the low coercive force of 427 oersteds, at 4600 oersteds applied field, results in a magnetic tape capable of high-density data recording in computer tape applications.

Example 3

A magnetic drum is made by using the material of ferrite Example 13 herein, mixed in a suitable acrylic plastic binder and applied as a uniform coating by conventional methods to a high-speed drum. The magnetic properties of the ferrite material cause the performance of this drum to exceed prior art drum performance in ability to record high-density signals without signal interaction, because of the spacer effect of the antiferromagnetic coating surrounding the active magnetic ferrite particles.

(b) LOW COERCIVITY DEVICES ($H_C < 50$ OERSTEDS)

Example 4

A memory plate is fabricated using the material of garnet Example 1 herein, by hot pressing the fluid energy-attrited, calcined garnet material to form a thin (10 mils or less) disc suitable for an open flux path memory element. This device is an improvement over prior art materials in that higher speed switching (switching constant less than 0.1 microsecond oersted) may be obtained, since the switching mechanism is by domain rotation rather than domain wall motion, as in conventional devices.

Example 5

The ferrimagnetic components of radio filter inductors and radio tuner inductors are fabricated from the materials of garnet Examples 1 through 6 herein, and from the materials of ferrite Examples 36 and 37 herein, by hot-pressing techniques. The resulting shapes are high-density ferrimagnetic materials. The following improvements over prior art devices should be noted: (a) addition of the alumina insulator reduces eddy current losses to new low values unobtainable by prior art devices; (b) the extremely narrow hysteresis loop, as shown by loops F and G of FIG. 1 herein, indicates the very low hysteresis loop losses associated with use of these materials in cores, and the resulting minimum temperature sensitivity as a function of power level; (c) control of the quality factor $\mu Q$ by varying the composition and ratio of insulator gives a unique means of tailor-making inductors and tuners for individual applications.

Example 6

Television flyback transformer cores are fabricated from the high-permeability, low-coercivity materials of garnet Examples 1 through 6 herein, and from the material of ferrite Examples 36 and 37 herein, in each case by hot pressing the fluid energy-attrited, calcined material to produce a toroid of high-density ferrimagnetic material that possesses the advantage of lower hysteresis loss, as indicated by loops F and G, in FIG. 1 herein, in higher frequency operation because of the single-domain characteristics of the ferrite particles.

Example 7

Low-coercivity microwave devices are fabricated using the material of garnet Examples 1 through 6 herein. In each case, the material is hot pressed after the final calcination and shaped by ceramic milling techniques, including diamond saw cutting.

Example 8

High-coercivity microwave devices are fabricated using the material of ferrite Examples 1 through 34 herein. The material is shaped as in Example 7.

Example 9

Uniaxial, extremely high-coercivity microwave devices are fabricated using the material of hexagonal iron oxide Examples 1 through 5 herein. The material is shaped as in Example 7. The microwave device of this example, and the devices of Examples 7 and 8, have these advantages over prior art devices: (a) single-domain particle size materials permit switching by domain rotation only for switching applications; (b) exchange anisotropy-coupled materials are advantageous for high-power applications where increased coercive force is required; (c) added insulating dielectrics permit broad banding and reduction of eddy current loss at high frequencies; (d) aligned uniaxial hexagonal iron oxides yield high internal fields for millimeter wave length devices; (e) mixed ferrites dispersed in insulating dielectrics permit broad banding and flexibility for specialized applications, such as frequency mixing.

Example 10

Rotators for gyrators are fabricated using the materials of garnet Examples 1 through 6 herein, in each case by hot pressing the material to approximately the desired shape after final calcination, and by final shaping using ceramic milling techniques. The performance of each of these devices is superior to that of prior art devices in that rotation is higher per unit length than unit volume, resulting in a minimum amount of ferrite material in the cylindrical wave guide cavity. Minimizing the volume of ferrite material reduces perturbations of higher modes.

Hysteresis heating in these devices in high-power applications is minimal, because of the narrow hysteresis loops exhibited by the devices, as indicated by loops F and G of FIG. 1 herein.

Broad banding of Faraday rotators is more effectively achieved by the present invention through use of dielectric insulators rather than external dielectric sleeves, as in prior art devices, since more intimate contact with the ferrite particles may be attained in the present invention through dispersion in dielectric insulators.

Example 11

A computer memory core is prepared using the material of ferrite Example 38 herein, by hot pressing the material into toroid form. Testing of the toroid with a hysteresis loop tester yields a vertically elongated rectangular hysteresis loop, ideally suited for memory core applications.

Example 12

A microferrite array is fabricated using the material of garnet Example 5 herein, by hot pressing the material to approximately the desired shape after final calcination, and by final shaping using ceramic milling techniques. Micro-holes are drilled by ultrasonic techniques and conventional evaporated film methods are used to interconnect the holes. The resulting microferrite array is superior to prior art arrays, particularly in that the eddy current coupling between adjacent holes is sharply reduced by the alumina insulator separating the ferrite particles. Further, a higher-speed switching is effected (switching constant less than 0.1 microsecond oersted) with this array with prior art devices, because switching is by domain rotation only, without domain wall motion.

Example 13

A multiaperture high-speed switching device core is fabricated using the material of garnet Example 5 herein, by hot pressing the material to approximately the desired shape after final calcination, and by final shaping using ceramic milling techniques. This device has a higher switching speed (switching constant less than 0.1 microsecond oersted) than corresponding prior art devices, because a singe magnetic domain rotational switching mechanism only is involved.

Example 14

A transformer core is fabricated using the material of ferrite Example 36 herein, by hot pressing the material to approximately the desired shape after final calcination, and by final shaping using ceramic milling techniques. The core exhibits a hysteresis loop similar to loop F of FIG. 1 herein, indicating a lower hysteresis loss and higher efficiency than is obtainablbe with corresponding prior art cores. These improvements are particularly advantageous in high-power applications and in applications where transformer power level is limited by core loss heating.

(D) Discussion of drawings

FIG. 1 is a graph showing comparisons of portions of hysteresis loops of particular ferrimagnetic materials according to the present invention with hysteresis loops of various prior art magnetic materials, and indicates that the magnetic properties of materials according to the present invention can be varied over an extremely wide range.

The portions of the hysteresis loops are shown third quadrant portions, obtained as follows. The specimens tested were in the form of discs one-quarter inch in diameter and one-eighth inch thick. Each disc in turn was placed in the magnet gap of a conventional vibrating sample magnetometer, with the diameter of the disc parallel to the applied field. The applied field was increased from zero to 4600 oersteds and then decreased to zero. The specimen was then rotated 180° about the diameter axis so that the residual field of the specimen opposed the direction of the applied field. The applied field was then increased at a gradual rate starting from zero. Because the magnetic induction of the specimen was negative as the result of rotation of the specimen, the magnetometer recorder pen rode on the bottom of the chart as though the induction were zero until the applied field was equal to the coercive force $H_C$. At this point, the trace of the hysteresis loop left the zero induction line and rose rapidly, approaching saturation induction at 4600 oersteds applied field. The applied field was then decreased to zero gradually, and the trace of the hysteresis loop reached the value of $B_R$ at zero field, completing the trace of the third quadrant portion of the hysteresis loop.

Loop A is a portion of the hysteresis loop of a disc made from the ferrimagnetic material of ferrite Example 16 herein, and indicates that the material has a high magnetic induction at saturation, together with a relatively high residual induction.

Loop B is a portion of a hysteresis loop of a disc made from a cobalt ferrite prepared by prior art methods and having the composition $$Co_{0.15}Fe_{0.85}^{+2}Fe_2^{+3}O_4$$

Loop C is a portion of a hysteresis loop of a disc prepared from γ-iron oxide of the type generally used commercially in magnetic tapes. It will be noted that the coercive force for this material is about 230 oersteds, and the residual induction is about 390 gauss.

Loop D is a portion of a hysteresis loop of a disc prepared from the ferrimagnetic material of ferrite Example 30 herein. It will be noted that this material possesses very desirable magnetic properties for magnetic tape applications, in this case a coercive force of 1084 oersteds and a residual induction of 650.6 gauss.

Loop E is a portion of a hysteresis loop of a disc made from the ferrimagnetic material of ferrite Example 1 herein. It will be noted that this material also possesses very desirable magnetic properties for magnetic tape applications, in this case a coercive force of 854.4 oersteds and a residual induction of 478.5 gauss.

Loop F is a portion of a hysteresis loop of a disc made from the ferrimagnetic material of ferrite Example 36 herein. It will be noted that the loop is so narrow as to have negligible area and appear as a single line, indicating that this material is valuable in applictions requiring low hysteresis losses. It will also be noted that this material exhibits a very low coercive force, making the material valuable for many applications wherein this characteristic is necessary.

Loop G is a portion of a hysteresis loop of a disc made from the ferrimagnetic material of ferrite Example 37 herein. It will be noted that this loop is similar to loop F in that it indicates the material to have a very low hysteresis loss and a very low coercive force.

Figure 2:
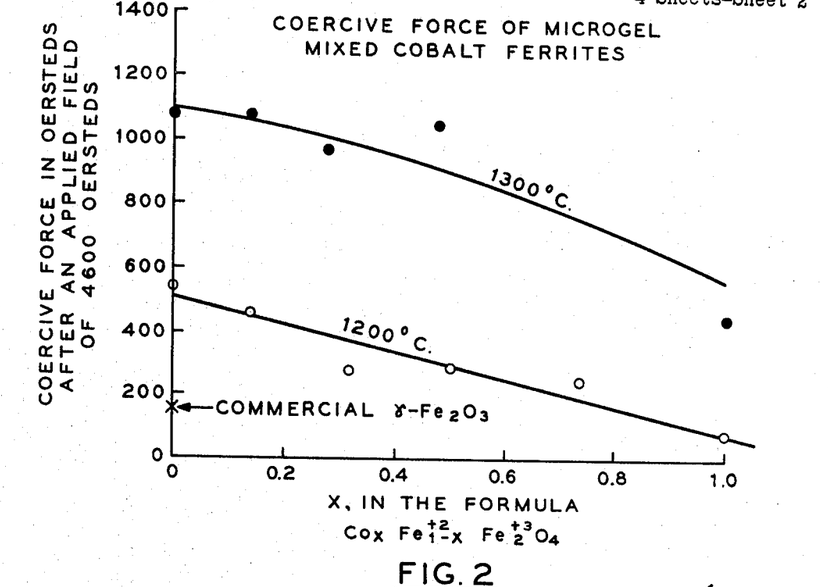
FIG. 2 is a graph showing coercive force after an applied field of 4600 oersteds as a function of composition, for various mixed cobalt ferrites according to the present invention, prepared with firing temperatures of 1200° C. and 1300° C., respectively.

FIG. 2 is a graph showing coercive force after an applied field of 4600 oersteds as a function of the composition, for various mixed cobalt ferrites according to the present invention, prepared by firing at 1200° C. for 4 hours, and by firing at 1300° C. for 4 hours, respectively. The increase in coercive force is attributable to increased exchange anisotropy coupling between the ferrimagnetic portion of the material and the antiferromagnetic portion. The principal factor during preparation of ferrimagnetic materials according to the present invention that influences coercive force is the firing temperature of the gel material. A subsidiary factor having less effect is the concentration of divalent cobalt, when cobalt ferrites are prepared. As the concentration of divalent cobalt increases, the concentration of α-iron oxide decreases, resulting in a decrease in coercive force.

The point X on the graph indicates the coercive force, after an applied field of 4600 oersteds, of commercial γ-$Fe_2O_3$, for purposes of comparing the coercive force of this material with the coercive force of the mixed cobalt ferrites according to the present invention.

Figure 3:
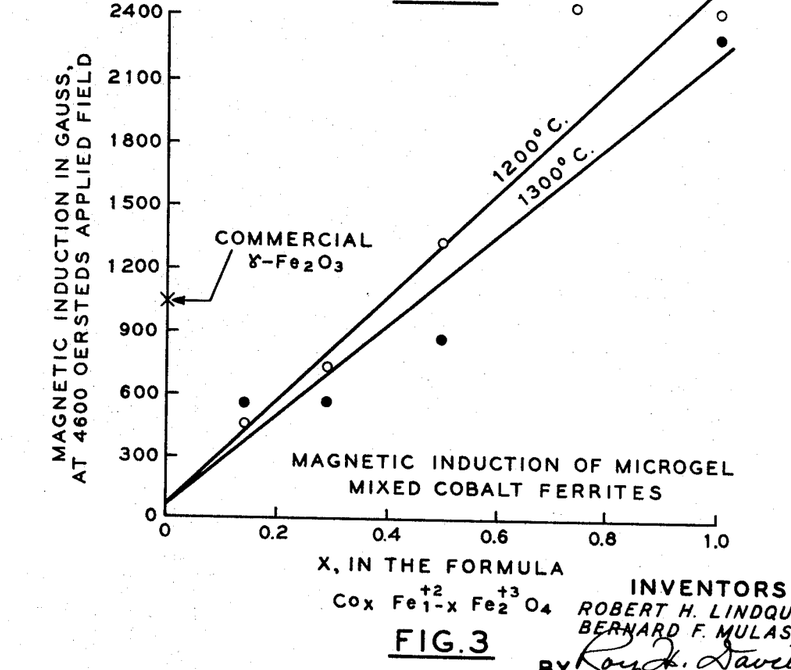
FIG. 3 is a graph of magnetic induction at a field of 4600 oersteds as a function of composition of mixed cobalt ferrites according to the present invention, prepared with firing temperatures of 1200° C. and 1300° C., respectively.

FIG. 3 is a graph of magnetic induction at a field of 4600 oersteds as a function of composition of mixed cobalt ferrites according to the present invention, prepared by firing at 1200° C. for 4 hours, and by firing at 1300° C. for 4 hours, respectively.

It will be noted that the magnetic induction varies little with firing temperature but increases drastically with increasing cobalt concentration. Part of the drastic increase is due to the decrease in α-iron oxide concentration with increasing cobalt concentration as described in connection with FIG. 2. The major portion of the drastic increase is due to increased saturation magnetization with an increased concentration of cobalt.

The point X on the graph indicates the magnetic induction in gauss at a field of 4600 oersteds of commercial $\gamma$-$Fe_2O_3$, for purposes of comparison with the magnetic induction of mixed cobalt ferrites according to the present invention.

Figure 4:
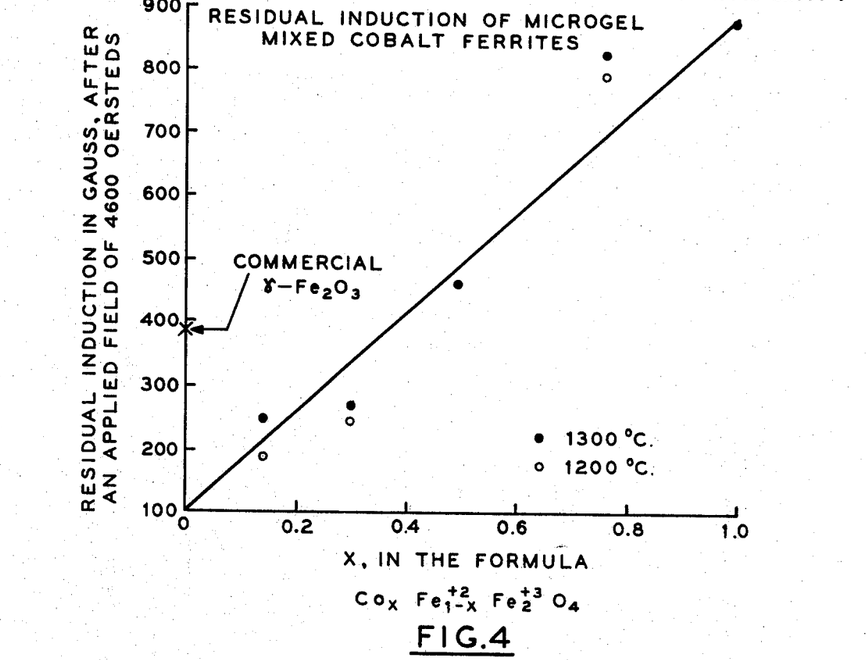
FIG. 4 is a graph of residual induction after an applied field of 4600 oersteds as a function of composition of mixed cobalt ferrites according to the present invention, prepared with firing temperatures of 1200° C. and 1300° C., respectively.

FIG. 4 is a graph of residual induction after an applied field of 4600 oersteds as a function of composition of mixed cobalt ferrites according to the present invention, prepared by firing for 4 hours at 1200° C., and by firing for 4 hours at 1300° C., respectively. It will be noted that the temperature of firing has a minor effect on residual induction, just as it had a minor effect on magnetic induction in FIG. 3. The major factor affecting the residual induction is the concentration of cobalt in the ferrite.

The point X on the graph indicates the magnetic induction in gauss at a field of 4600 oersteds of commercial $\gamma$-$Fe_2O_3$, for purposes of comparison with the magnetic induction of mixed cobalt ferrites according to the present invention.

Figure 5:
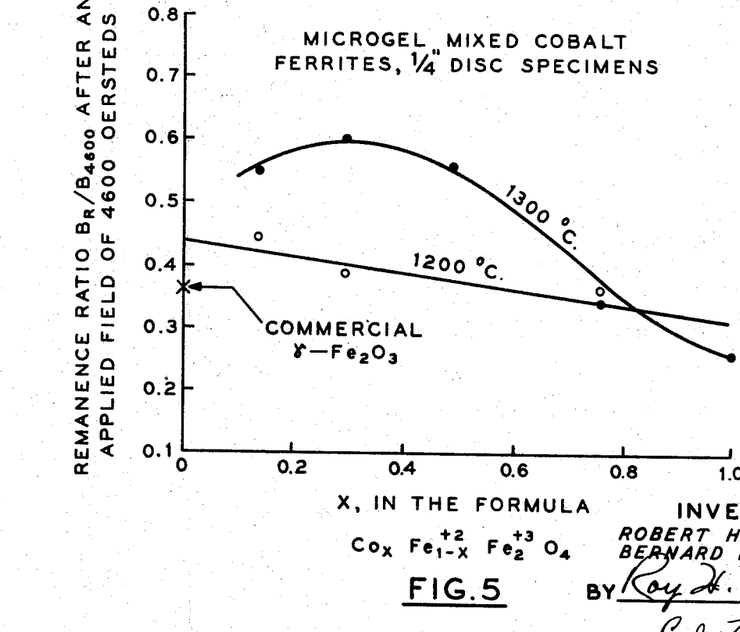
FIG. 5 is a graph of remanence ratio after an applied field of 4600 oersteds as a function of composition of mixed cobalt ferrites according to the present invention, prepared at firing temperatures of 1200° C. and 1300° C., respectively.

FIG. 5 is a graph of remenence ratio after an applied field of 4600 oersteds as a function of composition of mixed cobalt ferrites according to the present invention, prepared by firing for 4 hours at 1200° C., and by firing for 4 hours at 1300° C., respectively. The remanence ratio is substantially affected by both firing temperature and ferrite composition.

The high values of remenence ratio for various ferrite compositions according to the present invention, as shown by the two curves, are mainly due to the dispersing effect of an $\alpha$-iron oxide coating around each ferrite particle, which to a large degree prevents particle-to-particle magnetic interaction.

The poin X on the graph indicates the remenence ratio after an applied field of 4600 oersteds of commercial $\gamma$-$Fe_2O_3$, conventionally used as the magnetic component in coatings for magnetic tapes. The indicated low remanence ratio for commercial $\gamma$-$Fe_2O_3$ in primarily due to the close packing of the particles of $\gamma$-$Fe_2O_3$. In conventional magnetic tape manufacture, it is necessary to attempt to disperse the particles of $\gamma$-iron oxide in a plastic; however, it is extremely difficult even by this expedient to obtain a resulting remenence ratio of 0.7.

It will be noted that ferrites of the present invention can be produced with remanence ratios tailored to desired values, by varying temperature and ferrite composition during manufacture.

Figure 6:
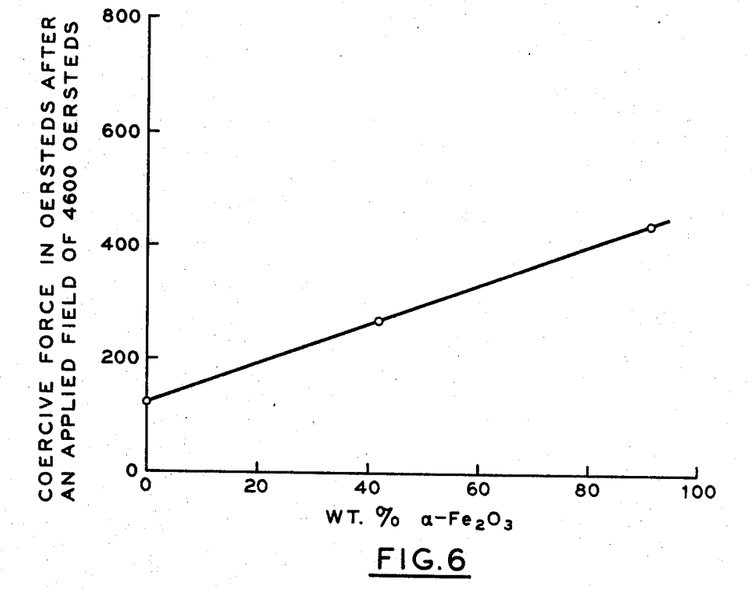
FIG. 6 is a graph showing coercive force, after an applied field of 4600 oersteds, of ferrimagnetic materials comprising mixed cobalt ferrites coupled by exchange anisotropy to $\alpha$-iron oxide in accordance with the present invention, as a function of weight percent of $\alpha$-iron oxide present.

FIG. 6 is a graph showing coercive force, after an applied field of 4600 oersteds, of ferrimagnetic materials comprising mixed cobalt ferrites coupled by exchange anisotropy to $\alpha$-iron oxide according to the present invention, as a function of the weight percent of $\alpha$-iron oxide present. The weight percent of $\alpha$-iron oxide was determined by conventional X-ray diffraction powder techniques. As the concentration of $\alpha$-iron oxide increases, the thickness of the $\alpha$-iron oxide surrounding the ferrite nucleus of each particle increases. Therefore, the number of electron spins coupled to the ferrite nucleus by exchange anisotropy increases; therefore the material has a higher coercive force because a larger external field is needed to change the orientation of the magnetization of the material from one easy direction to another.

Figure 7:
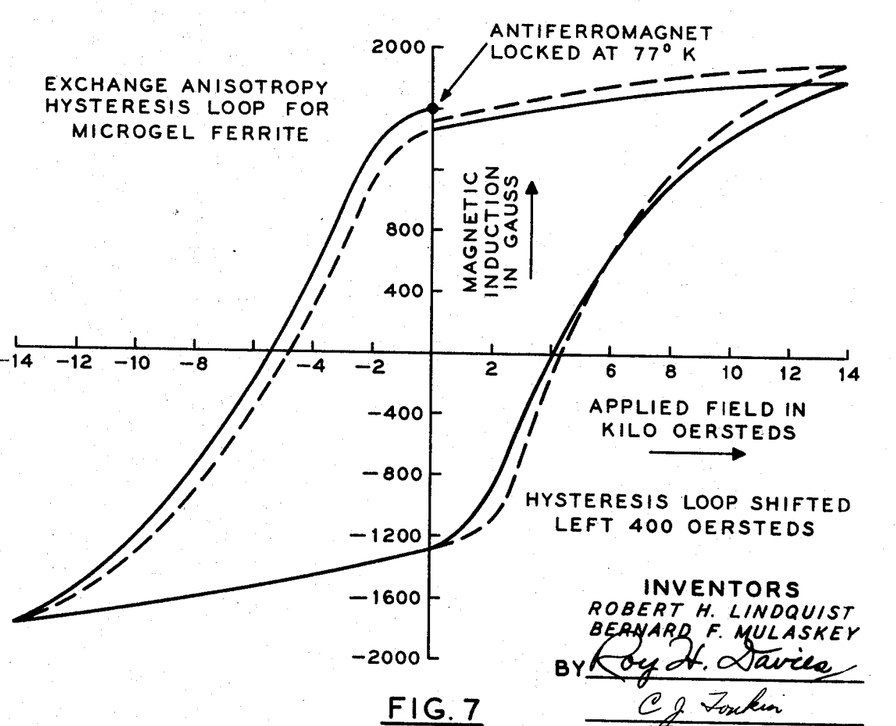
FIG. 7 is a graph of a hysteresis loop demonstrating exchange anisotropy coupling between the ferrimagnetic component and the antiferromagnetic component of a high coercive force material according to the present invention.

FIG. 7 is a graph of a hysteresis loop demonstrating exchange anisotropy coupling between the $\alpha$-iron oxide component and the cobalt ferrite nucleus component of particles according to the present invention. The hysteresis loop shown was obtained in the following manner. A specimen made from the material of ferrite Example 32 herein, having a coercive force above 5000 oersteds at −196° C., comprising cobalt ferrite and 50 volume percent $\alpha$-iron oxide, was magnetized in a field of 15,000 oersteds, to "lock in" the spins of the cobalt ferrite and the $\alpha$-iron oxide. The specimen was then cooled in liquid nitrogen (−196° C.), the field was removed, and the specimen was rotated 180° in the equipment used to apply the field, so that the next application of a field would be in a direction opposite to the previous applied field. A hysteresis loop was then obtained for the specimen, and was traced through all quadrants twice, yielding the curve shown. The final cyclic loop is displaced approximately 400 oersteds to the left due to the magnetic bias resulting from "locking in" antiferromagnetic $\alpha$-iron oxide preferred orientation as it was cooled below −20° C., the Morin transition temperature. This foregoing is the recognized definitive test for determining the existence of exchange anisotropy coupling, which coupling is proven to exist by the displaced hysteresis loop.

What is claimed is:

1. Ferrimagnetic material particles having a pore volume above 0.02 cc. per gram and a surface area above 2 square meters per gram, each surrounded by a high-resistivity metal-oxide insulator, prepared by a process which comprises forming, by cogelation using an alkylene oxide, a ferrimagnetic material precursor comprising a uniform metal hydroxide gel, which upon heating to a temperature above 600° C. would be changed in structure to a ferrimagnetic material structure having said pore volume and said surface area, passing said gel together with a liquid medium comprising a halide of the metal of the desired insulator and a lower alkanol through a colloid mill to form a uniform suspension of fine particles of said gel in said liquid medium, adding a lower alkylene oxide to said suspension to cause gelation of said liquid medium and thereby to produce a uniform dispersion of said gel particles in a gel of the desired insulator, and heating said gel particles to a temperature above 600° C. to convert the structure of said gel particles to the desired ferrimagnetic material structure, and to convert said insulator gel to a solid form of the desired insulator, whereby ferrimagnetic particles individually isolated in the desired insulator are produced.

2. Ferrimagnetic particles as in claim 1, wherein said gel particles in said gel of the desired insulator are powdered to an average particle size below 1 micron.

3. Ferrimagnetic material particles each surrounded by an alumina insulator, prepared by a process which comprises forming a precursor of said ferrimagnetic material comprising a uniform metal hydroxide gel, which upon drying and heating to a temperature above 600° C. would be changed in structure to a ferrimagnetic structure, passing said gel together with aluminum chloride and a lower alkanol through a colloid mill to form a uniform suspension of fine particles of said gel, adding a lower alkylene oxide to said suspension to form a uniform dispersion of said gel particles in an $Al(OH)_3$ gel, and heating said uniform dispersion to a temperature above 800° C. to convert the structure of said gel particles to the desired ferrimagnetic material structure, and to convert said $Al(OH)_3$ gel to solid $\alpha$-$Al_2O_3$, whereby ferrimagnetic particles individually isolated in $\alpha$-$Al_2O_3$ insulating material are produced.

4. A composition comprising a mass of microporous ferrimagnetic particles having a pore volume above 0.02 cc. per gram and a surface area above 2 square meters per gram, at least a preponderance of said particles being substantially surrounded by an antiferromagnetic material and magnetically coupled to said antiferromagnetic material by exchange anisotropy.

5. A composition as in claim 4, wherein said antiferromagnetic material is selected from $\alpha$-$Fe_2O_3$ and $\alpha$-$Cr_2O_3$.

6. A composition as in claim 4, wherein said ferrimagnetic particles are selected from the group consisting of ferrites, garnets and hexagonal iron oxides, and wherein said antiferromagnetic material is selected from $\alpha$-$Fe_2O_3$ and $\alpha$-$Cr_2O_3$.

7. A magnetic material comprising a ferrimagnetic particle having an average particle diameter below one micron, a pore volume above 0.02 cc. per gram, and a surface area above 2 square meters per gram, substantially surrounded by $\alpha$-Al$_2$O$_3$.

8. A mass of macroscopically homogeneous ferrimagnetic material in particulate form, the particles having an average diameter below about one micron, each one of a predominance of the particles consisting essentially of a ferrimagnetic ferrospinel substantially surrounded by $\alpha$-iron oxide, said mass having an $\alpha$-iron oxide content of about 5 to 95 percent by weight, said mass being characterized by a coercive force in excess of 500 oersteds after an applied field of 4600 oersteds.

9. A mass of ferrimagnetic material as in claim 8, a predominance of said particles further being individually isolated in a non-magnetic high-resistivity metal-oxide insulating material.

References Cited

UNITED STATES PATENTS

| | | | |
|---|---|---|---|
| 2,980,617 | 4/1961 | Ireland | 252—62.58 |
| 2,999,275 | 9/1961 | Blume | 252—62.63 |
| 3,004,918 | 10/1961 | Schnettler | 252—62.56 |
| 3,047,429 | 7/1962 | Stoller et al. | 252—62.56 |

TOBIAS E. LEVOW, Primary Examiner

R. D. EDWARDS, Assistant Examiner

U.S. Cl. X.R.

117—100, 234; 252—62.57, 62.63, 62.64

UNITED STATES PATENT OFFICE
CERTIFICATE OF CORRECTION

Patent No. 3,535,245          Dated October 20, 1970

Inventor(s) ROBERT H. LINDQUIST and BERNARD F. MULASKEY

It is certified that error appears in the above-identified patent and that said Letters Patent are hereby corrected as shown below:

Col. 1, line 43, "$M^{2+}Fe^{3+}O_4$" should read --$M^{2+}Fe_2^{3+}O_4$--

Col. 3, line 74, "competition" should read --composition--.

Col. 4, lines 63-64, "characterize" should read --characterizes--.

Col. 14, line 57, "vertified" should read --verified--.

Col. 14, line 69, "$FeCl_2$ ... g..428.2" should read --$FeCl_3$ ... g..428.2--

Col. 15, line 5, "netic material." should read --FIG. 1 herein.--

Col. 18, line 74, and Col. 19, line 15, "$CH_3OH$ (water of hydration of chlorides) ... cc..750" should read
--$CH_3OH$ .......................... cc..750
   Water of hydration of chlorides--

Col. 20, line 30, "oride" should read --oxide--.

Col. 21, lines 2-3, ". The resulting material set up into a onds." should read --, and milling was continued for 30 seconds.--.

Col. 22, line 74, "variable" should read --variables--.

Col. 25, line 43, "obtainablbe" should read --obtainable--.

Col. 25, line 55, "loops are shown" should read --loops shown are--.

Col. 26, line 35, "applictions" should read --applications--.

Col. 27, line 23, "remenence" should read --remanence--.

Col. 27, line 36, "poin" should read --point--.

Col. 27, line 40, "in" should read --is--.

SIGNED AND SEALED
JAN 5 1971

(SEAL)
Attest:
Edward M. Fletcher, Jr.
Attesting Officer

WILLIAM E. SCHUYLER, JR.
Commissioner of Patents